(12) United States Patent
Polishchuk et al.

(10) Patent No.: US 8,638,310 B1
(45) Date of Patent: Jan. 28, 2014

(54) CAPACITIVE TOUCH SCREEN

(75) Inventors: Igor Polishchuk, Fremont, CA (US); Edward Grivna, Brooklyn Park, MN (US)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 13/445,747

(22) Filed: Apr. 12, 2012

Related U.S. Application Data

(63) Continuation of application No. 12/413,580, filed on Mar. 29, 2009, now Pat. No. 8,174,510.

(51) Int. Cl.
*G06F 3/041* (2006.01)

(52) U.S. Cl.
USPC ........................................ 345/173

(58) Field of Classification Search
None
See application file for complete search history.

(56) References Cited

U.S. PATENT DOCUMENTS

| | | |
|---|---|---|
| 4,090,092 A | 5/1978 | Serrano |
| 4,186,392 A | 1/1980 | Holz |
| 4,233,522 A | 11/1980 | Grummer et al. |
| 4,671,153 A | 6/1987 | Peyre |
| 4,686,332 A | 8/1987 | Greanias et al. |
| 5,374,787 A | 12/1994 | Miller et al. |
| 5,488,204 A | 1/1996 | Mead et al. |
| 5,495,077 A | 2/1996 | Miller et al. |
| 5,543,588 A | 8/1996 | Bisset et al. |
| 5,543,590 A | 8/1996 | Gillespie et al. |
| 5,543,591 A | 8/1996 | Gillespie et al. |
| 5,648,642 A | 7/1997 | Miller et al. |
| 5,841,078 A | 11/1998 | Miller et al. |
| 5,861,583 A | 1/1999 | Schediwy et al. |
| 5,869,790 A | 2/1999 | Shigetaka et al. |
| 5,880,411 A | 3/1999 | Gillespie et al. |
| 5,889,236 A | 3/1999 | Gillespie et al. |
| 5,912,655 A | 6/1999 | Hoshino et al. |
| 5,914,465 A | 6/1999 | Allen et al. |
| 5,952,998 A | 9/1999 | Clancy |
| 6,002,594 A | 12/1999 | Ledin et al. |
| 6,028,271 A | 2/2000 | Gillespie et al. |
| 6,147,680 A | 11/2000 | Tareev |
| 6,188,391 B1 | 2/2001 | Seely et al. |
| 6,239,389 B1 | 5/2001 | Allen et al. |
| 6,297,811 B1 | 10/2001 | Kent et al. |
| 6,380,931 B1 | 4/2002 | Gillespie et al. |
| 6,411,344 B2 | 6/2002 | Fujii |
| 6,414,671 B1 | 7/2002 | Gillespie et al. |
| 6,504,312 B2 | 1/2003 | Tuenge et al. |
| 6,535,203 B2 | 3/2003 | Shigetaka |
| 6,610,936 B2 | 8/2003 | Gillespie et al. |
| 6,750,852 B2 | 6/2004 | Gillespie et al. |
| 6,970,160 B2 | 11/2005 | Mulligan et al. |
| 7,019,765 B2 | 3/2006 | Fujiwara et al. |

(Continued)

OTHER PUBLICATIONS

U.S. Appl. No. 12/413,580: "Capacitive Touch Screen" Igor Polishchuk et al., filed Mar. 29, 2009; 57 pages.

(Continued)

*Primary Examiner* — Adam R Giesy

(57) ABSTRACT

An embodiment of a capacitive touch screen may comprise a display device comprising a substantially transparent substrate, a first plurality of electrodes attached to the substantially transparent substrate, wherein the first plurality of electrodes are substantially parallel in a first direction, and a second plurality of electrodes, wherein each of the second plurality of electrodes is capacitively coupled with each of the first plurality of electrodes.

19 Claims, 20 Drawing Sheets

(56) References Cited

U.S. PATENT DOCUMENTS

| | | |
|---|---|---|
| 7,030,860 B1 | 4/2006 | Hsu et al. |
| 7,129,935 B2 | 10/2006 | Mackey |
| 7,202,859 B1 | 4/2007 | Speck et al. |
| 7,218,124 B1 | 5/2007 | Mackey et al. |
| 7,382,139 B2 | 6/2008 | Mackey |
| 7,450,113 B2 | 11/2008 | Gillespie et al. |
| 7,463,246 B2 | 12/2008 | MacKey |
| 7,479,949 B2 | 1/2009 | Jobs et al. |
| 7,548,073 B2 | 6/2009 | Mackey et al. |
| 2002/0000979 A1 | 1/2002 | Furuhashi et al. |
| 2003/0043631 A1 | 3/2003 | Gilton et al. |
| 2006/0207806 A1 | 9/2006 | Philipp |
| 2007/0008299 A1 | 1/2007 | Hristov |
| 2007/0097991 A1 | 5/2007 | Tatman |
| 2007/0247443 A1 | 10/2007 | Philipp |
| 2007/0257893 A1 | 11/2007 | Philipp |
| 2007/0279395 A1 | 12/2007 | Philipp et al. |
| 2008/0041640 A1 | 2/2008 | Gillespie et al. |
| 2008/0042994 A1 | 2/2008 | Gillespie et al. |
| 2008/0048997 A1 | 2/2008 | Gillespie et al. |
| 2008/0122976 A1 | 5/2008 | Kubota |
| 2008/0143683 A1 | 6/2008 | Hotelling |
| 2008/0158183 A1 | 7/2008 | Hotelling et al. |
| 2008/0165158 A1 | 7/2008 | Hotelling et al. |
| 2008/0246496 A1 | 10/2008 | Hristov et al. |
| 2008/0278178 A1 | 11/2008 | Philipp |
| 2008/0309633 A1 | 12/2008 | Hotelling et al. |
| 2009/0002337 A1* | 1/2009 | Chang ............... 345/174 |
| 2009/0015761 A1 | 1/2009 | Stockham |
| 2009/0096760 A1 | 4/2009 | Ma et al. |
| 2010/0007626 A1* | 1/2010 | Lai ............... 345/174 |
| 2010/0026655 A1 | 2/2010 | Harley |

OTHER PUBLICATIONS

USPTO Non-Final Rejection for U.S. Appl. No. 12/413,580 dated Sep. 15, 2011; 8 pages.

USPTO Notice of Allowance for U.S. Appl. No. 12/413,580 dated Mar. 8, 2012; 8 pages.

* cited by examiner

CAPACITIVE TOUCH SCREEN

RELATED APPLICATIONS

This application is a continuation application of U.S. application Ser. No. 12/413,580 filed Mar. 29, 2009, which is incorporated herein by reference.

BACKGROUND

Conventional computing devices provide several ways for enabling a user to interact with them. For example, a user may utilize a capacitive touch screen device to interact with a computing device. It is pointed out that there are varying capacitive sensing technologies that are used in conjunction with conventional touch screen devices. However, the differing capacitive sensing technologies may include one or more optical issues that degrade the viewing pleasure of the touch screen user.

SUMMARY

One embodiment in accordance with the invention can include a capacitive touch screen. The capacitive touch screen includes a substantially transparent substrate and a plurality of electrodes formed on the substantially transparent substrate. The plurality of electrodes are substantially parallel in a first direction and each of the plurality of electrodes includes a layer of light altering material. Additionally, each of the plurality of electrodes is for aligning with a gap or mask between pixels of a display device.

While a particular embodiment in accordance with the invention has been specifically described within this Summary, it is noted that the invention and the claimed subject matter are not limited in any way by this embodiment.

DETAILED DESCRIPTION

Reference will now be made in detail to various embodiments in accordance with the invention, examples of which are illustrated in the accompanying drawings. While the invention will be described in conjunction with various embodiments, it will be understood that these various embodiments are not intended to limit the invention. On the contrary, the invention is intended to cover alternatives, modifications and equivalents, which may be included within the scope of the invention as construed according to the Claims. Furthermore, in the following detailed description of various embodiments in accordance with the invention, numerous specific details are set forth in order to provide a thorough understanding of the invention. However, it will be evident to one of ordinary skill in the art that the invention may be practiced without these specific details. In other instances, well known methods, procedures, components, and circuits have not been described in detail as not to unnecessarily obscure aspects of the invention.

Figure 1:
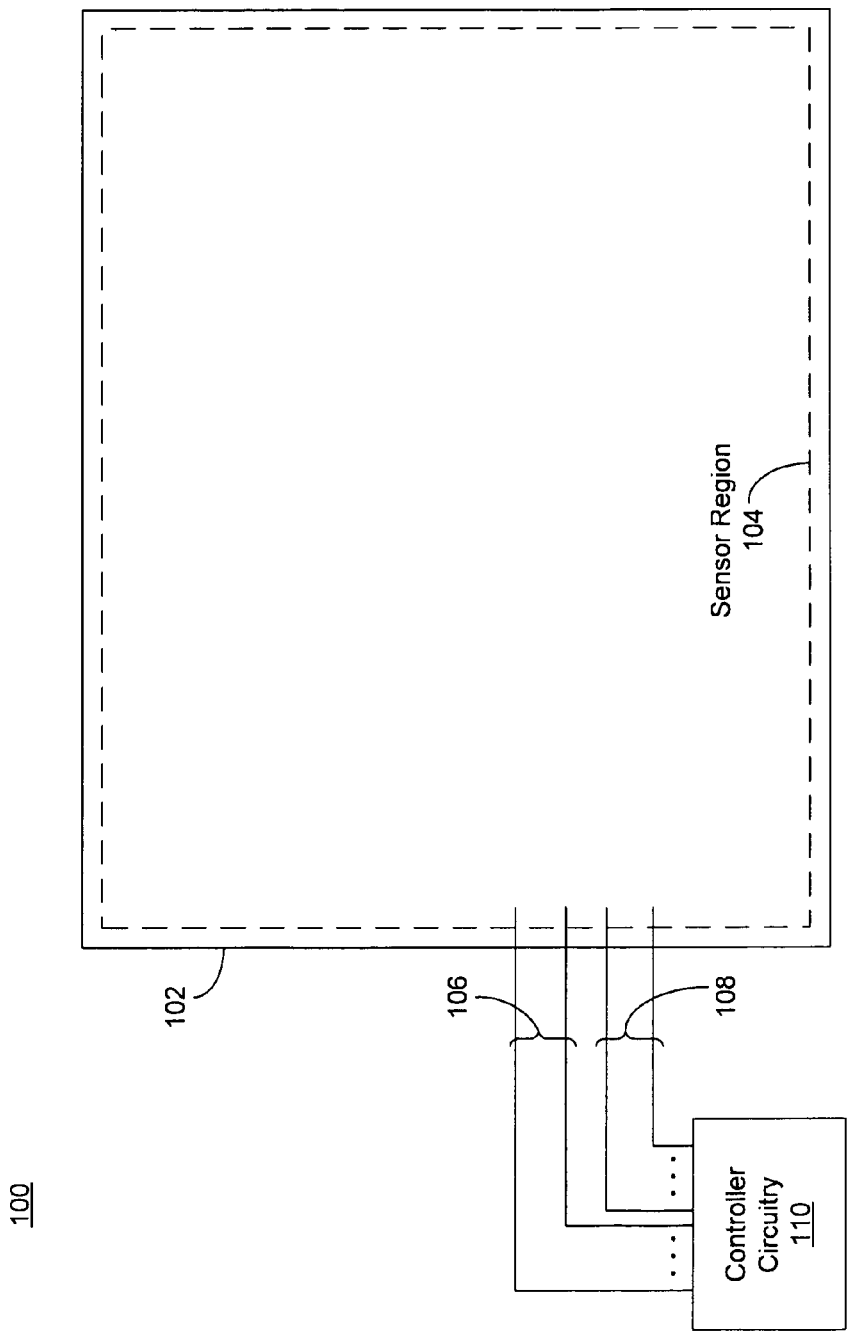
FIG. 1 is a plan view of an exemplary two-dimensional capacitive touch screen device that can be implemented to include one or more embodiments of the invention.

FIG. 1 is a plan view of an exemplary two-dimensional capacitive touch screen device 100 that can be implemented to include one or more embodiments of the invention. It is noted that the two-dimensional capacitive touch screen device 100 can be utilized to communicate user input (e.g., via a user's finger or probe) to a computing device or other electronic device. The two-dimensional capacitive touch screen device 100 can be placed over or directly patterned upon a display device (not shown), e.g., a liquid crystal display (LCD), a plasma display, a cathode ray tube (CRT), an organic light emitting diode (OLED) display, and the like. As such, a user would view the display by looking through the substantially transparent sensing region 104 of the capacitive touch screen device 100 as shown. Note that one or more embodiments in accordance with the invention can be incorporated with the capacitive touch screen device 100.

In one embodiment, the capacitive touch screen device 100 can include a substantially transparent substrate 102 which can be implemented in a wide variety of ways. For example, the substantially transparent substrate 102 can be implemented using, but is not limited to, glass, plastic, and the like. The substantially transparent substrate 102 may also be a part of the display device (e.g., LCD, plasma, CRT, OLED, and the like). In an embodiment, a controller circuitry 110 can be coupled to the sensor electrodes formed on or within the substantially transparent substrate 102 via a first group of conductive wires (or electrical conductors) 106 and a second group of conductive wires (or electrical conductors) 108. It is noted that the conductors 106 and/or 108 can be utilized for coupling the controller circuitry 110 with any electrodes or wires (not shown) that form a sensor region 104 (represented by the dashed line enclosure) of the capacitive touch screen device 100. In this fashion, the capacitive touch screen device 100 is able to operate. Each of the groups of conductive wires 106 and 108 can include one or more conductive wires or electrical conductors. It is pointed out that embodiments of electrodes (or wires) in accordance with the invention are described herein which can form the sensor region 104 of the two-dimensional capacitive touch screen device 100.

It is noted that the capacitive touch screen device 100 may not include all of the elements illustrated by FIG. 1. Additionally, the capacitive touch screen device 100 can be implemented to include one or more elements not illustrated by FIG. 1. It is pointed out that the capacitive touch screen device 100 can be utilized or implemented in any manner similar to that described herein, but is not limited to such.

Figure 2:
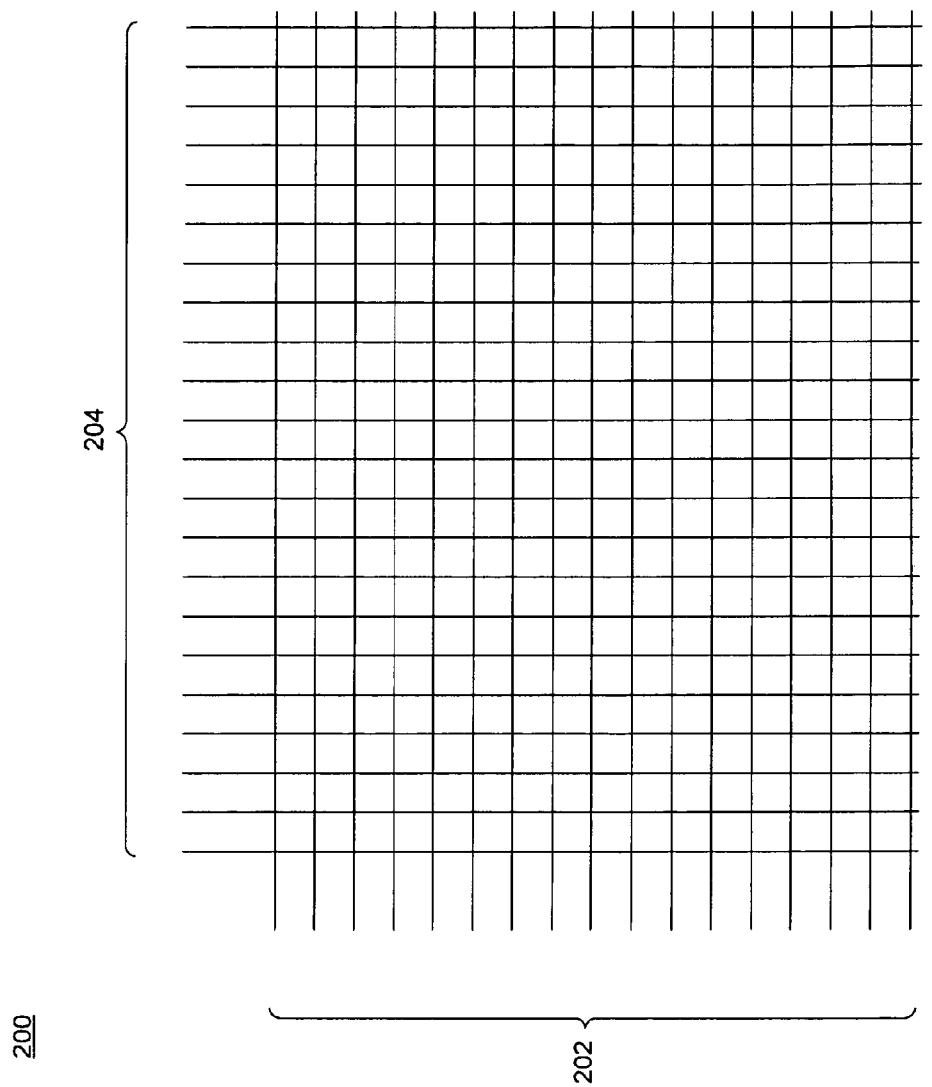
FIG. 2 is a plan view of an exemplary capacitive sensor pattern in accordance with various embodiments of the invention.

FIG. 2 is a plan view of an exemplary capacitive sensor pattern 200 in accordance with various embodiments of the invention. Specifically, in one embodiment, the capacitive sensor pattern 200 includes a plurality of horizontal electrodes or wires 202 (e.g., which allow sensing of position in the Y-axis) that are substantially parallel and a plurality of vertical electrodes or wires 204 (e.g., which allow sensing of position in the X-axis) that are substantially parallel. In one embodiment, the electrodes 202 are approximately orthogonal (or perpendicular) to electrodes 204, and vice versa. It is pointed out that the electrodes 202 are not electrically connected to electrodes 204, and where they cross each other are insulated by a dielectric separator, but are not limited to such.

Figure 2A:
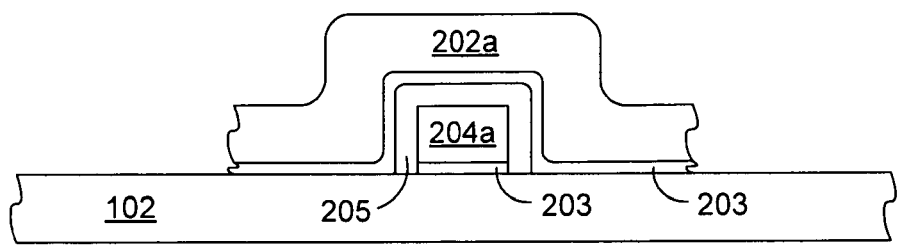
FIG. 2A is a side sectional view of an exemplary crossing of electrodes in accordance with various embodiments of the invention.

Note that the crossing of electrodes 202 and 204 can be implemented in a wide variety of ways. For example in one embodiment, FIG. 2A is a side sectional view of an exemplary crossing of an electrode 202a and an electrode 204a. Note that the electrode 202a is electrically insulated from the electrode 204a by an insulated material layer 205. FIG. 2A also illustrates that each of the electrodes 202a and 204a can include one or more layers or coatings of light altering material 203 (e.g., an anti-reflective material or a light absorbing material) in order to reduce the visibility of the electrodes 202a and 204a. It is noted that in embodiments where the light altering material 203 is also non-conductive (e.g., an insulator), it may serve as the dielectric separator/insulated material and layer 205 may not be present.

Note that the electrodes 202 and 204 of the capacitive sensor pattern 200 can be implemented in a wide variety of ways. For example, each of the electrodes 202 and 204 can be formed or manufactured from one or more metals, such as, copper, aluminum, chromium, gold, silver, and tin, but is not limited to such and may be other conductive materials (e.g., carbon). Moreover, note that each of the electrodes 202 and 204 can be formed or manufactured to also include one or more layers or coatings of light altering material (e.g., an anti-reflective material or a light absorbing material) in order to reduce the visibility of the electrodes 202 and 204 to a user of the capacitive touch screen device 100. Furthermore, the anti-reflective material can be implemented in a wide variety of ways. For example, the anti-reflective material can include, but is not limited to, a dielectric, silicon oxide, silicon nitride, polymer, glue, and the like. In one embodiment, if the anti-reflective material is a dielectric material, the following conditions may be followed: the refractive index of the dielectric layer or coating can be approximately equal to the square root of the refractive index of the underlying material; and the thickness of the dielectric layer or coating can be approximately a quarter wavelength of the incident light, e.g., 200-300 nanometers, but is not limited to such. In addition, the anti-reflective material coating can consist of several dielectric layers with alternating dielectric constants. The light absorbing material can be implemented in a wide variety of ways. For example, the light absorbing material can include, but is not limited to, visible light absorbing photo resist material, metal oxide, or carbon black. In one embodiment, each of the electrodes 202 and 204 has a width of less than or equal to approximately 10 micrometers, but is not limited to such.

Figure 2B:
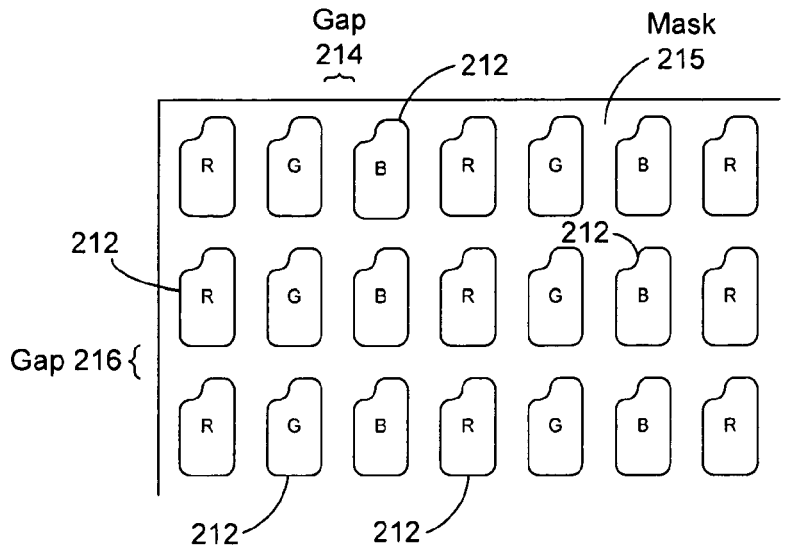
FIG. 2B is a plan sectional view of exemplary display device pixels in accordance with various embodiments of the invention.
Figure 2C:
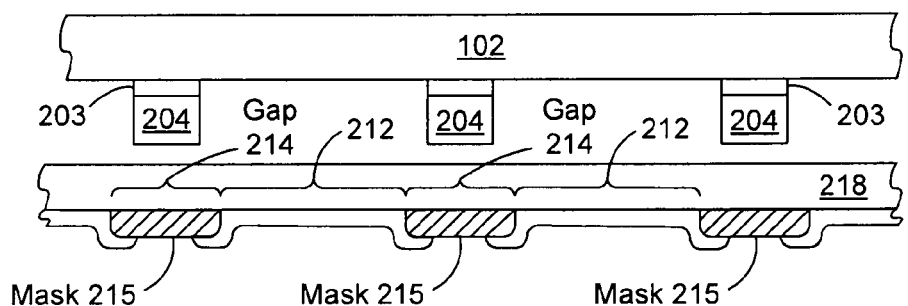
FIG. 2C is a side sectional view of an exemplary display device in accordance with various embodiments of the invention.
Figure 2D:
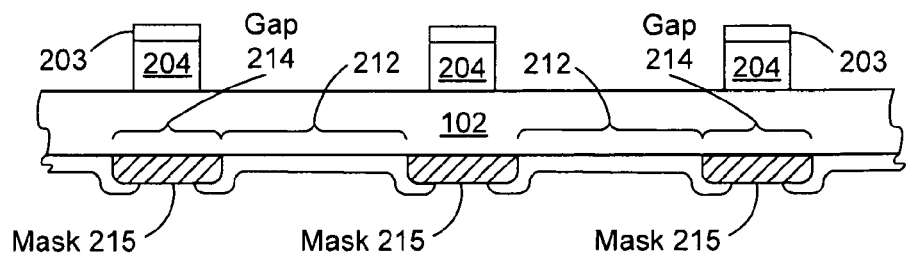
FIG. 2D is a side sectional view of another exemplary display device in accordance with various embodiments of the invention.

It is pointed out that the electrodes 202 in FIG. 2 are spaced in a substantially uniform manner, but are not limited to such. Additionally, the electrodes 204 are also spaced in a substantially uniform manner, but are not limited to such. In one embodiment, when the capacitive touch screen device 100 that includes the capacitive sensor pattern 200 is placed over or integrated as part of a display device, each of the electrodes 202 and 204 can be aligned with, within, or positioned over a gap or mask between pixels of the display device, thereby further reducing the visibility of the electrodes 202 and 204 to a user. For example, FIG. 2B is a plan sectional view of an exemplary array of pixels 212 of a display device in accordance with an embodiment of the invention. In one embodiment, the display device can include one or more pixel masks 215 that prevent the emission of visible light from the spaces or gaps located between the pixels 212. In this manner, the pixel mask 215 defines the pixels 212 of the display device. As noted, there are gaps located between the pixels 212 of the display device where visible light is not emitted. For example, gap 214 indicates one of multiple gaps that extend between the pixels 212 in the vertical direction while gap 216 indicates one of multiple gaps that extend between the pixels 212 in the horizontal direction. As such, each of the electrodes 202 (FIG. 2) can be aligned within or positioned over a gap similar to gap 216 (FIG. 2B) while each of the electrodes 204 can be aligned within or positioned over a gap similar to gap 214, thereby further reducing the visibility of the electrodes 202 and 204 to a user. Moreover, each of the electrodes 202 and 204 (FIG. 2) can be aligned within or positioned over the mask 215 (FIG. 2B) located between the pixels 212 of the display device, thereby further reducing the visibility of the electrodes 202 and 204 to a user. In one embodiment, FIG. 2C is a side sectional view of electrodes 204 as formed on the substantially transparent substrate 102 aligned with the gaps 214 and the mask 215 located between the pixels 212 of the display device and positioned above the upper substrate 218 of the display device. In one embodiment, FIG. 2D is a side sectional view of electrodes 204 as formed on the top surface of the display device, which is the top surface of the substantially transparent substrate 102. Note that the electrodes 204 are aligned with the gaps 214 and the mask 215 located between the pixels 212 of the display device.

Within FIG. 2, note that the electrodes 202 and 204 can be coupled to the controller circuitry 110 in a wide variety of ways. For example in one embodiment, each of the electrodes 202 can be connected independently to the controller circuitry 110 via the conductive wires 108, but is not limited to such. Additionally, in one embodiment, each of the electrodes 204 can be connected independently to the controller circuitry 110 via the conductive wires 106, but is not limited to such.

It is noted that the capacitive sensor pattern 200 may not include all of the elements illustrated by FIG. 2. Additionally, the capacitive sensor pattern 200 can be implemented to include one or more elements not illustrated by FIG. 2. It is pointed out that the capacitive sensor pattern 200 can be utilized or implemented in any manner similar to that described herein, but is not limited to such.

Figure 3:
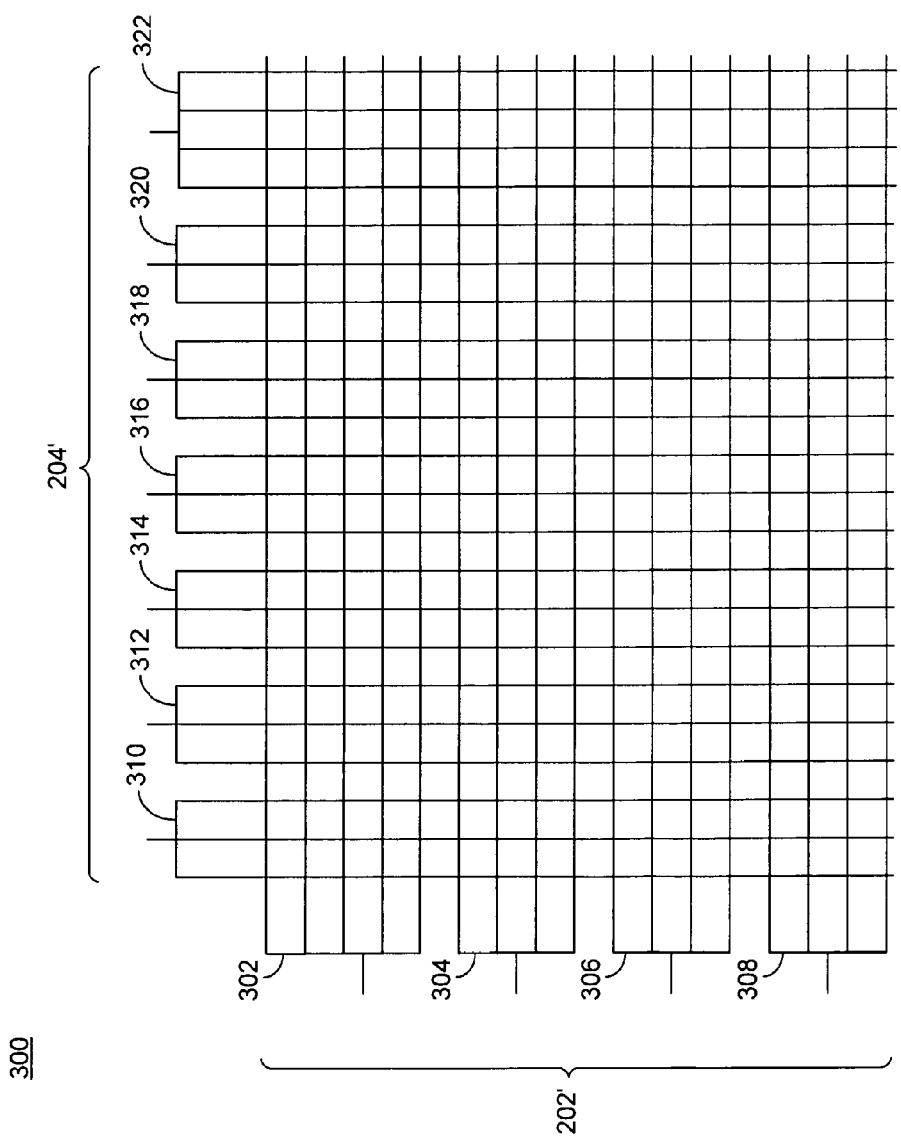
FIG. 3 is a plan view of another exemplary capacitive sensor pattern in accordance with various embodiments of the invention.

FIG. 3 is a plan view of an exemplary capacitive sensor pattern 300 in accordance with various embodiments of the invention. It is pointed out that the elements of FIG. 3 having the same reference numbers as the elements of any other figure herein can operate or function in any manner similar to that described herein, but are not limited to such. Note that the capacitive sensor pattern 300 can include, but is not limited to, a plurality of horizontal electrodes or wires 202' (e.g., which allow sensing of position in the Y-axis) that are substantially parallel and a plurality of vertical electrodes or wires 204' (e.g., which allow sensing of position in the X-axis) that are substantially parallel. It is pointed out that the electrodes 202' and 204' can be implemented in a wide variety of ways. For example in one embodiment, one or more subsets (or groups) of the electrodes 202' can be coupled together. For instance in the present embodiment, the electrodes 202' include four different subsets 302, 304, 306 and 308 of electrodes that are coupled together, but is not limited to such. Furthermore, in one embodiment, one or more subsets of the electrodes 204' can be coupled together. For example in the present embodiment, the electrodes 204' include seven different subsets 310, 312, 314, 316, 318, 320 and 322 of electrodes that are coupled together, but is not limited to such. In one embodiment, each of the electrodes 202' and 204' has a width of less than or equal to approximately 10 micrometers, but is not limited to such. It is pointed out that the subsets 302, 304, 306, 308, 310, 312, 314, 316, 318, 320 and 322 can each be implemented to include the same or different number of sensor elements. For example, subset 302 includes five sensor elements while subsets 304, 306 and 308 each include four sensor elements, but are not limited to such. In addition, subset 322 includes four sensor elements while subsets 310, 312, 314, 316, 318 and 320 each includes three sensor elements, but are not limited to such.

It is noted that the capacitive sensor pattern 300 may not include all of the elements illustrated by FIG. 3. Additionally, the capacitive sensor pattern 300 can be implemented to include one or more elements not illustrated by FIG. 3. It is pointed out that the capacitive sensor pattern 300 can be utilized or implemented in any manner similar to that described herein, but is not limited to such.

Figure 4:
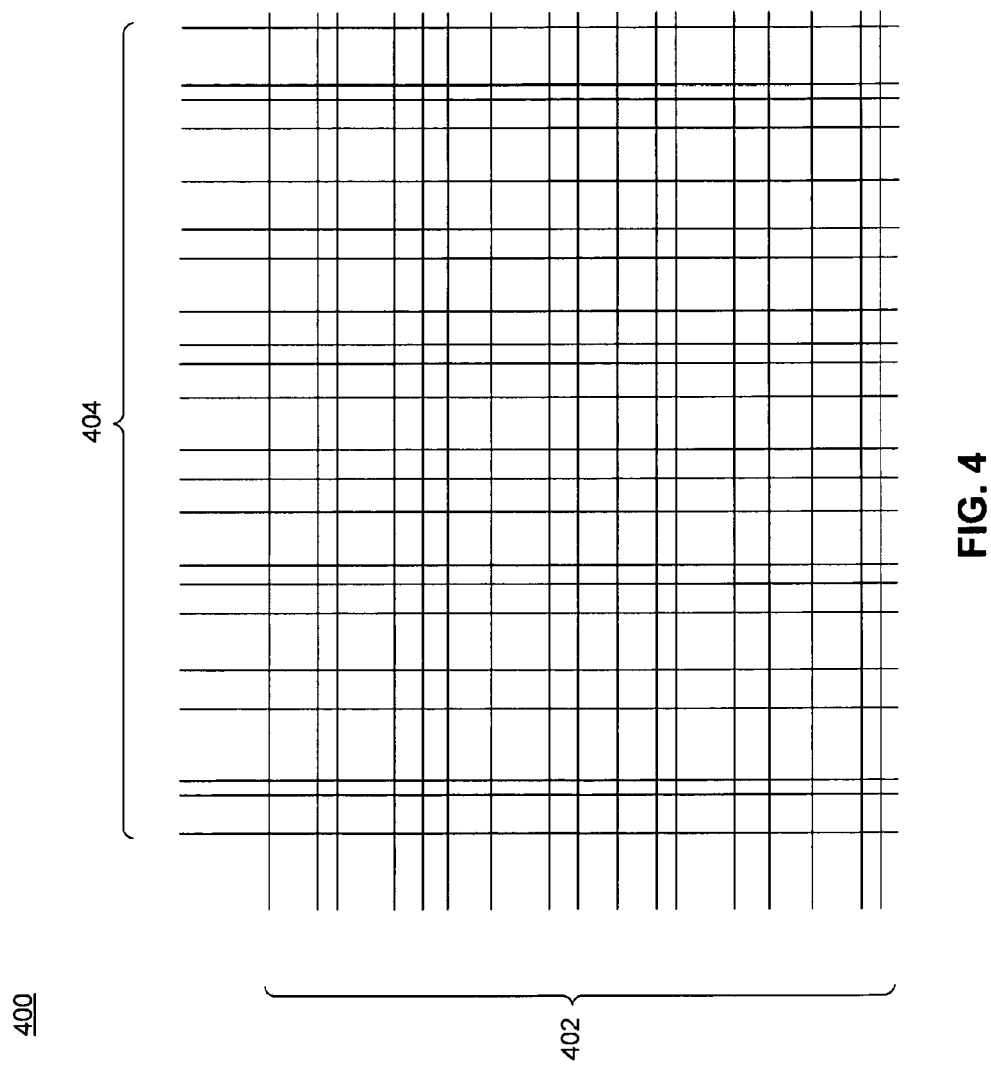
FIG. 4 is a plan view of yet another exemplary capacitive sensor pattern in accordance with various embodiments of the invention.

FIG. 4 is a plan view of an exemplary capacitive sensor pattern 400 in accordance with various embodiments of the invention. Specifically, in one embodiment, the capacitive sensor pattern 400 includes a plurality of horizontal electrodes or wires 402 (e.g., which allow sensing of position in the Y-axis) that are substantially parallel and a plurality of vertical electrodes or wires 404 (e.g., which allow sensing of position in the X-axis) that are substantially parallel. It is pointed out that the electrodes 402 are not electrically connected to electrodes 404, and where they cross each other are insulated by a dielectric separator, but are not limited to such. In one embodiment, the electrodes 402 are approximately orthogonal (or perpendicular) to electrodes 404, and vice versa. Note that the electrodes 402 and 404 can be implemented in a wide variety of ways. For example in one embodiment, each of the electrodes 402 and 404 can be formed or manufactured from one or more metals, such as, copper, aluminum, chromium, gold, silver, and tin, but is not limited to such and may be other conductive materials (e.g., carbon). Additionally, each of the electrodes 402 and 404 can be formed or manufactured to also include one or more layers or coatings of light altering material (e.g., an anti-reflective material or a light absorbing material) in order to reduce the visibility of the electrodes 402 and 404 to a user of the capacitive touch screen device 100. The anti-reflective material can be implemented in a wide variety of ways. For example, the anti-reflective material can include, but is not limited to, a dielectric, silicon oxide, silicon nitride, polymer, glue, and the like. Furthermore, the light absorbing material can be implemented in a wide variety of ways. For example in one embodiment, the light absorbing material can include, but is not limited to, visible light absorbing photo resist material, metal oxide, or carbon black. In one embodiment, each of the electrodes 402 and 404 has a width of less than or equal to approximately 10 micrometers, but is not limited to such.

Within the embodiment shown in FIG. 4, each of the electrodes 402 is spaced in an aperiodic manner, but is not limited to such. That is, each of the electrodes 402 is located at a pseudo random interval (e.g., non-periodic) in order to break up the periodicity of the electrodes 402 and prevent a user from seeing interference patterns. In addition, each of the electrodes 404 is located at a pseudo random interval or aperiodic manner in order to break up the periodicity of the electrodes 404 and prevent a user from seeing interference patterns, but is not limited to such. In one embodiment, when the capacitive touch screen device 100 that includes the capacitive sensor pattern 400 is placed over or integrated as part of a display device, each of the electrodes 402 and 404 can be aligned within or positioned over a gap or mask between pixels of the display device, thereby further reducing the visibility of the electrodes 402 and 404 to a user. It is noted that the electrodes 402 and 404 can be coupled to the controller circuitry 110 in a wide variety of ways. For example in one embodiment, each of the electrodes 402 can be connected independently to the controller circuitry 110 via the conductive wires 108, but is not limited to such. Furthermore, in one embodiment, each of the electrodes 404 can be connected independently to the controller circuitry 110 via the conductive wires 106, but is not limited to such.

It is noted that the capacitive sensor pattern 400 may not include all of the elements illustrated by FIG. 4. Additionally, the capacitive sensor pattern 400 can be implemented to include one or more elements not illustrated by FIG. 4. It is pointed out that the capacitive sensor pattern 400 can be utilized or implemented in any manner similar to that described herein, but is not limited to such.

Figure 5:
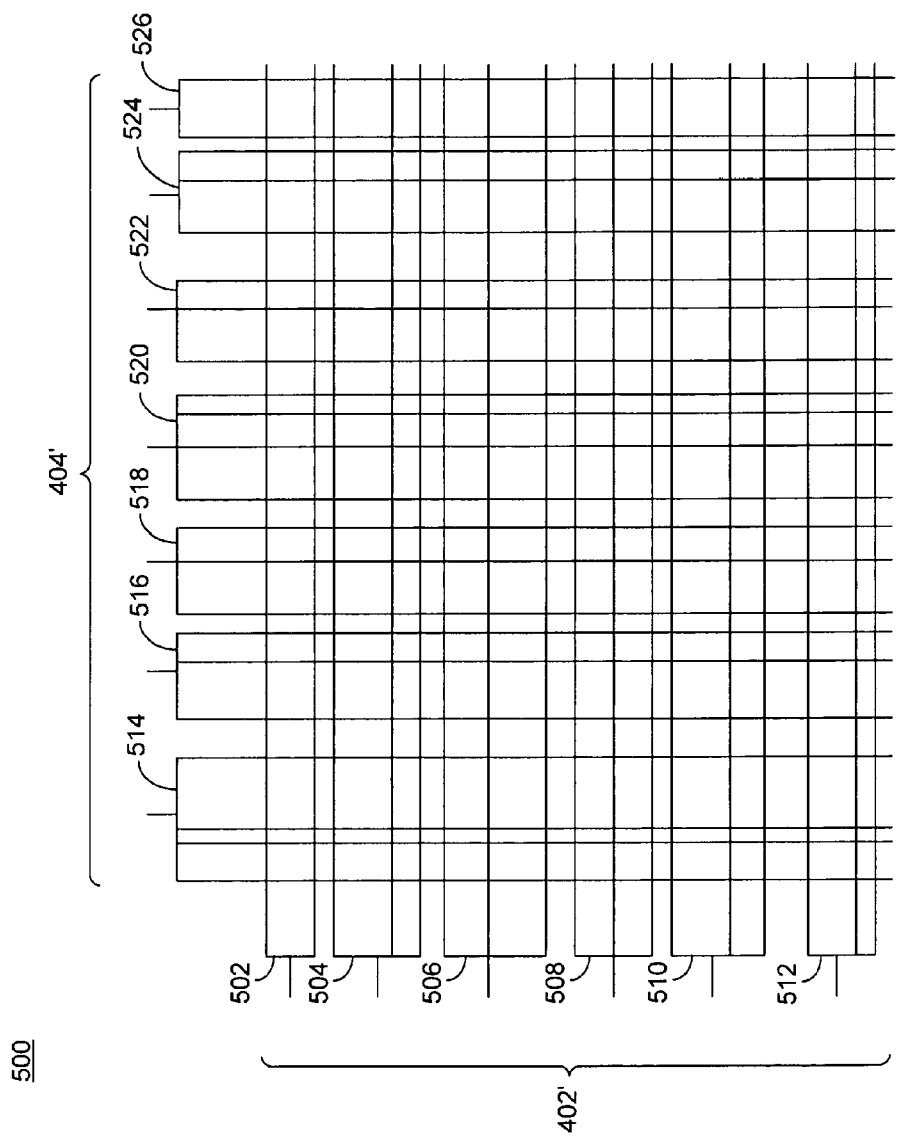
FIG. 5 is a plan view of still another exemplary capacitive sensor pattern in accordance with various embodiments of the invention.

FIG. 5 is a plan view of an exemplary capacitive sensor pattern 500 in accordance with various embodiments of the invention. It is pointed out that the elements of FIG. 5 having the same reference numbers as the elements of any other figure herein can operate or function in any manner similar to that described herein, but are not limited to such. Note that the capacitive sensor pattern 500 can include, but is not limited to, a plurality of horizontal electrodes or wires 402' (e.g., which allow sensing of position in the Y-axis) that are substantially parallel and a plurality of vertical electrodes or wires 404' (e.g., which allow sensing of position in the X-axis) that are substantially parallel. It is noted that the electrodes 402' and 404' can be implemented in a wide variety of ways. For example in one embodiment, one or more subsets (or groups) of the electrodes 402' can be coupled together. For instance in the present embodiment, the electrodes 402' include six different subsets 502, 504, 506, 508, 510 and 512 of electrodes that are coupled together, but is not limited to such. In addition, in one embodiment, one or more subsets of the electrodes 404' can be coupled together. For example in the present embodiment, the electrodes 404' include seven different subsets 514, 516, 518, 520, 522, 524 and 526 of electrodes that are coupled together, but is not limited to such. In one embodiment, each of the electrodes 402' and 404' has a width of less than or equal to approximately 10 micrometers, but is not limited to such. It is pointed out that the subsets 502, 504, 506, 508, 510, 512, 514, 516, 518, 520, 522, 524 and 526 can each be implemented to include the same or different number of sensor elements. For example, subset 502 includes two sensor elements while subsets 504, 506, 508, 510 and 512 each include three sensor elements, but are not limited to such. Additionally, subset 526 includes two sensor elements, subsets 516, 518, 522 and 524 each includes three sensor elements, while subsets 514 and 520 each includes four sensor elements, but are not limited to such.

It is noted that the capacitive sensor pattern 500 may not include all of the elements illustrated by FIG. 5. Additionally, the capacitive sensor pattern 500 can be implemented to include one or more elements not illustrated by FIG. 5. It is pointed out that the capacitive sensor pattern 500 can be utilized or implemented in any manner similar to that described herein, but is not limited to such.

Figure 6:
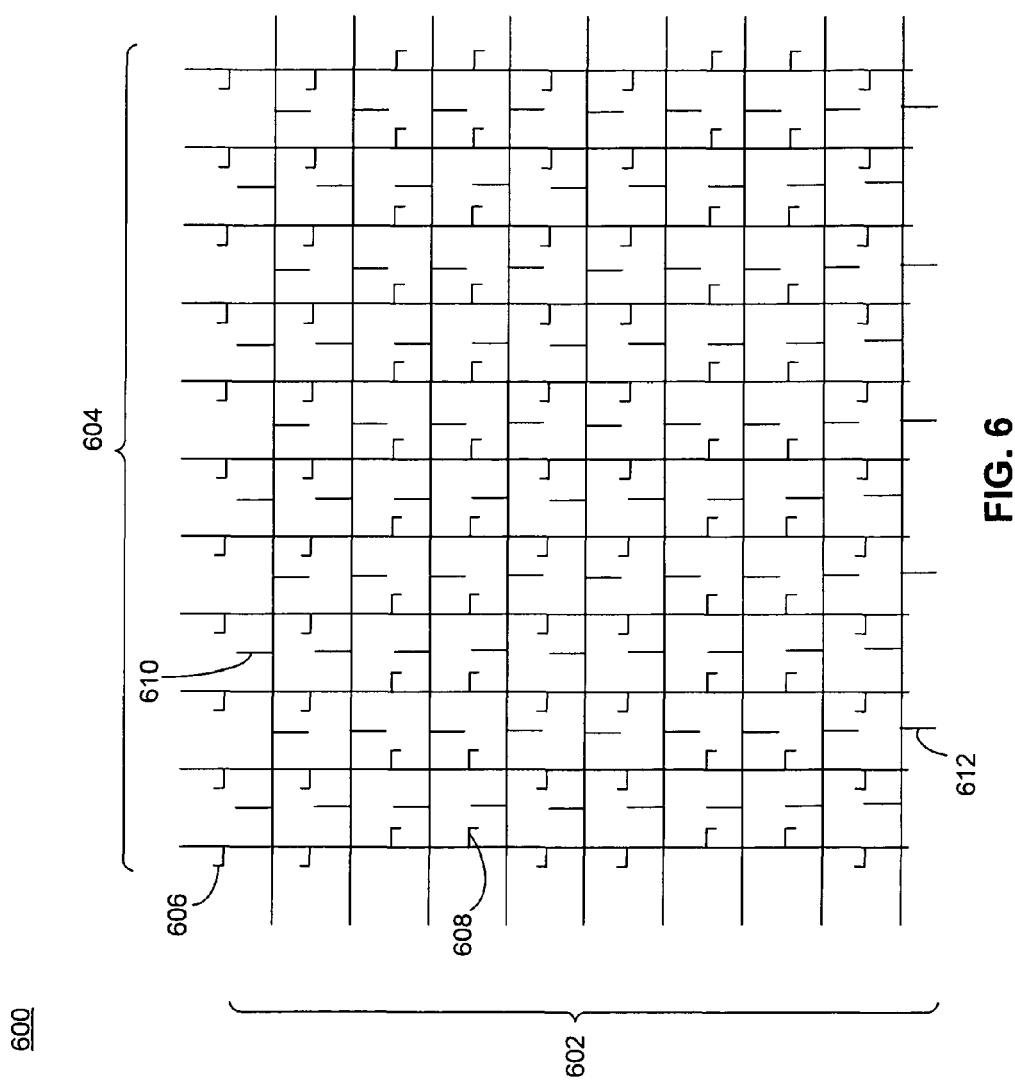
FIG. 6 is a plan view of another exemplary capacitive sensor pattern in accordance with various embodiments of the invention.

FIG. 6 is a plan view of an exemplary capacitive sensor pattern 600 in accordance with various embodiments of the invention. Specifically, in one embodiment, the capacitive sensor pattern 600 includes a plurality of horizontal electrodes or wires 602 (e.g., which allow sensing of position in the Y-axis) that are substantially parallel and a plurality of vertical electrodes or wires 604 (e.g., which allow sensing of position in the X-axis) that are substantially parallel. It is pointed out that the electrodes 602 are not electrically connected to electrodes 604, and where they cross each other are insulated by a dielectric separator, but are not limited to such. In one embodiment, the electrodes 602 are approximately orthogonal (or perpendicular) to electrodes 604, and vice versa. Note that the electrodes 602 and 604 can be implemented in a wide variety of ways. For example, each of the electrodes 602 can be formed or manufactured to include one or more dendrites (e.g., 610 and 612). In addition, each of the electrodes 604 can be formed or manufactured to include one or more dendrites (e.g., 606 and 608). In this manner, the dendrites 606, 608, 610, and 612 of the electrodes 602 and 604 can produce improved capacitive coupling with a user's figure or a probe along with removing optical interference patterns. Note that in one embodiment, each of the electrodes 602 and 604 can be formed or manufactured from one or more metals, such as, copper, aluminum, chromium, gold, silver, and tin, but is not limited to such and may be other conductive materials (e.g., carbon). Furthermore, each of the electrodes 602 and 604 can be formed or manufactured to also include one or more layers or coatings of light altering material (e.g., an anti-reflective material or a light absorbing material) in order to reduce the visibility of the electrodes 602 and 604 to a user of the capacitive touch screen device 100. The anti-reflective material can be implemented in a wide variety of ways. For example, the anti-reflective material can include, but is not limited to, a dielectric, silicon oxide, silicon nitride, polymer, glue, and the like. Additionally, the light absorbing material can be implemented in a wide variety of ways. For example in one embodiment, the light absorbing material can include, but is not limited to, visible light absorbing photo resist material, metal oxide, or carbon black. In one embodiment, each of the electrodes 602 and 604 has a width of less than or equal to approximately 10 micrometers, but is not limited to such.

Note that the electrodes 602 are spaced in a substantially uniform manner, but are not limited to such. Additionally, the electrodes 604 are also spaced in a substantially uniform manner, but are not limited to such. In one embodiment, when the capacitive touch screen device 100 that includes the capacitive sensor pattern 600 is placed over or formed onto a display device, each of the electrodes 602 and 604 and their dendrites 606, 608, 610, and 612 can be aligned within or positioned over a gap or mask between pixels of the display device, thereby further reducing the visibility of the electrodes 602 and 604 to a user. It is noted that the electrodes 602 and 604 can be coupled to the controller circuitry 110 in a wide variety of ways. For example in one embodiment, each of the electrodes 602 can be connected independently to the controller circuitry 110 via the conductive wires 108, but is not limited to such. Additionally, in one embodiment, each of the electrodes 604 can be connected independently to the controller circuitry 110 via the conductive wires 106, but is not limited to such. In an embodiment, one or more subsets (or groups) of the electrodes 602 can be coupled together in any manner similar to that described herein, but is not limited to such. Moreover in one embodiment, one or more subsets of the electrodes 604 can be coupled together in any manner similar to that described herein, but is not limited to such. In one embodiment, each of the electrodes 602 can be spaced in any periodic or aperiodic manner similar to that described herein, but is not limited to such. Furthermore in one embodiment, each of the electrodes 604 can be spaced in any periodic or aperiodic manner similar to that described herein, but is not limited to such.

It is noted that the capacitive sensor pattern 600 may not include all of the elements illustrated by FIG. 6. Additionally, the capacitive sensor pattern 600 can be implemented to include one or more elements not illustrated by FIG. 6. It is pointed out that the capacitive sensor pattern 600 can be utilized or implemented in any manner similar to that described herein, but is not limited to such.

Figure 7:
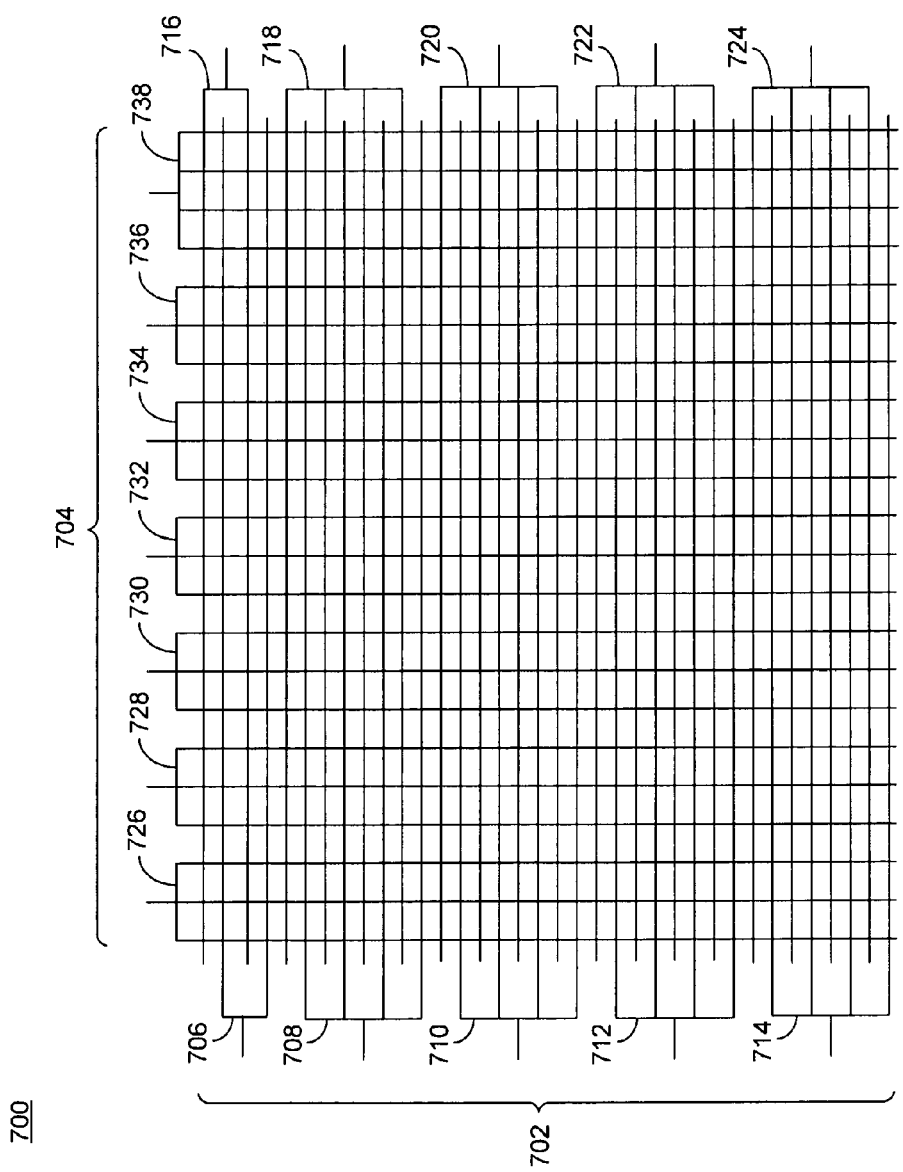
FIG. 7 is a plan view of yet another exemplary capacitive sensor pattern in accordance with various embodiments of the invention.

FIG. 7 is a plan view of an exemplary capacitive sensor pattern 700 in accordance with various embodiments of the invention. Specifically, in one embodiment, the capacitive sensor pattern 700 includes a plurality of horizontal electrodes or wires 702 (e.g., which allow sensing of position in the Y-axis) that are substantially parallel and a plurality of vertical electrodes or wires 704 (e.g., which allow sensing of position in the X-axis) that are substantially parallel. It is pointed out that the electrodes 702 are not electrically connected to electrodes 704, and where they cross each other are insulated by a dielectric separator, but are not limited to such. In one embodiment, the electrodes 702 are approximately orthogonal (or perpendicular) to electrodes 704, and vice versa. Note that the electrodes 702 and 704 can be implemented in a wide variety of ways. For example in one embodiment, one or more subsets (or groups) of the electrodes 702 can be coupled together. For instance in the present embodiment, the electrodes 702 include ten different subsets 706, 708, 710, 712, 714, 716, 718, 720, 722 and 724 of electrodes that are coupled together, but is not limited to such. Moreover in the present embodiment, each of the subsets 706, 708, 710, 712, 714, 716, 718, 720, 722 and 724 of the electrodes 702 is interleaved with its neighboring subsets of the electrodes 702. In one embodiment, the subsets or groups of the electrodes 704 can be interleaved in a manner similar to the subsets or groups of the electrodes 702, but is not limited to such. Within the present embodiment, one or more subsets of the electrodes 704 can be coupled together. For example in the present embodiment, the electrodes 704 include seven different subsets 726, 728, 730, 732, 734, 736 and 738 of electrodes that are coupled together, but is not limited to such. However, within the present embodiment, the different subsets of the electrodes 704 are not interleaved but may be in an alternate embodiment. It is pointed out that the subsets 706, 708, 710, 712, 714, 716, 718, 720, 722, 724, 726, 728, 730, 732, 734, 736 and 738 can each be implemented to include the same or different number of sensor elements. For example, subset 706 and 716 each include two sensor elements while subsets 708, 710, 712, 714, 718, 720, 722 and 724 each includes four sensor elements, but are not limited to such. In addition, subset 738 includes four sensor elements while subsets 726, 728, 730, 732, 734 and 736 each includes three sensor elements, but are not limited to such.

In one embodiment, each of the electrodes 702 and 704 can be formed or manufactured from one or more metals, such as, copper, aluminum, chromium, gold, silver, and tin, but is not limited to such and may be other conductive materials (e.g., carbon). Furthermore, each of the electrodes 702 and 704 can be formed or manufactured to also include one or more layers or coatings of light altering material (e.g., an anti-reflective material or a light absorbing material) in order to reduce the visibility of the electrodes 702 and 704 to a user of the capacitive touch screen 100. The anti-reflective material can be implemented in a wide variety of ways. For example, the anti-reflective material can include, but is not limited to, a dielectric, silicon oxide, silicon nitride, polymer, glue, and the like. Additionally, the light absorbing material can be implemented in a wide variety of ways. For example in one embodiment, the light absorbing material can include, but is not limited to, visible light absorbing photo resist material, metal oxide, or carbon black. In one embodiment, each of the electrodes 702 and 704 has a width of less than or equal to approximately 10 micrometers, but is not limited to such.

Within FIG. 7, the electrodes 702 are spaced in a substantially uniform interleaved manner, but are not limited to such. Additionally, the electrodes 704 are also spaced in a substantially uniform manner, but are not limited to such. In one embodiment, when the capacitive touch screen device 100 that includes the capacitive sensor pattern 700 is placed over or formed onto a display device, each of the electrodes 702 and 704 can be aligned within or positioned over a gap or mask between pixels of the display device, thereby further reducing the visibility of the electrodes 702 and 704 to a user. It is noted that the electrodes 702 and 704 can be coupled to the controller circuitry 110 in a wide variety of ways. For example in one embodiment, one or more subsets of the electrodes 702 can be connected to the controller circuitry 110 via the conductive wires 108, but is not limited to such. Moreover, one or more subsets of the electrodes 704 can be connected to the controller circuitry 110 via the conductive wires 106, but is not limited to such. In one embodiment, each of the electrodes 702 can be spaced in any periodic or aperiodic manner similar to that described herein, but is not limited to such. Furthermore in one embodiment, each of the electrodes 704 can be spaced in any periodic or aperiodic manner similar to that described herein, but is not limited to such.

It is noted that the capacitive sensor pattern 700 may not include all of the elements illustrated by FIG. 7. Additionally, the capacitive sensor pattern 700 can be implemented to include one or more elements not illustrated by FIG. 7. It is pointed out that the capacitive sensor pattern 700 can be utilized or implemented in any manner similar to that described herein, but is not limited to such.

Figure 8:
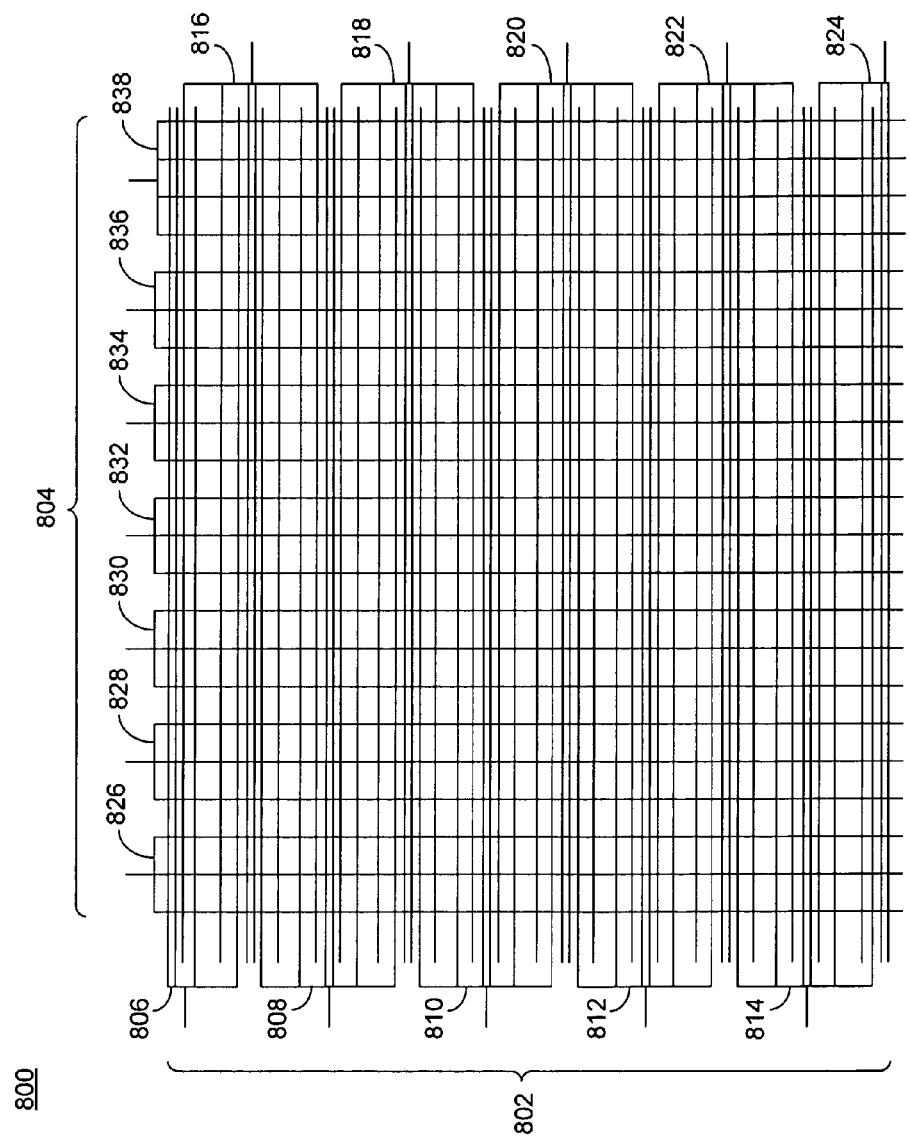
FIG. 8 is a plan view of another exemplary capacitive sensor pattern in accordance with various embodiments of the invention.

FIG. 8 is a plan view of an exemplary capacitive sensor pattern 800 in accordance with various embodiments of the invention. Specifically, in one embodiment, the capacitive sensor pattern 800 includes a plurality of horizontal electrodes or wires 802 (e.g., which allow sensing of position in the Y-axis) that are substantially parallel and a plurality of vertical electrodes or wires 804 (e.g., which allow sensing of position in the X-axis) that are substantially parallel. It is pointed out that the electrodes 802 are not electrically connected to electrodes 804, and where they cross each other are insulated by a dielectric separator, but are not limited to such. In one embodiment, the electrodes 802 are approximately orthogonal (or perpendicular) to electrodes 804, and vice versa. Note that the electrodes 802 and 804 can be implemented in a wide variety of ways. For example in one embodiment, one or more subsets (or groups) of the electrodes 802 can be coupled together. For instance in the present embodiment, the electrodes 802 include ten different subsets 806, 808, 810, 812, 814, 816, 818, 820, 822 and 824 of electrodes that are coupled together, but is not limited to such. Moreover in the present embodiment, each of the subsets 806, 808, 810, 812, 814, 816, 818, 820, 822 and 824 of the electrodes 802 is interleaved with its neighboring subsets of the electrodes 802. In one embodiment, the subsets or groups of the electrodes 804 can be interleaved in a manner similar to the subsets or groups of the electrodes 802, but is not limited to such. Within the present embodiment, one or more subsets of the electrodes 804 can be coupled together. For example in the present embodiment, the electrodes 804 include seven different subsets 826, 828, 830, 832, 834, 836 and 838 of electrodes that are coupled together, but is not limited to such. However, within the present embodiment, the different subsets of the electrodes 804 are not interleaved but may be in an alternate embodiment. It is pointed out that the subsets 806, 808, 810, 812, 814, 816, 818, 820, 822, 824, 826, 828, 830, 832, 834, 836 and 838 can each be implemented to include the same or different number of sensor elements. For example, subset 806 and 824 each include four sensor elements while subsets 808, 810, 812, 814, 816, 818, 820 and 822 each includes six sensor elements, but are not limited to such. In addition, subset 838 includes four sensor elements while subsets 826, 828, 830, 832, 834 and 836 each includes three sensor elements, but are not limited to such.

In one embodiment, each of the electrodes 802 and 804 can be formed or manufactured from one or more metals, such as, copper, aluminum, chromium, gold, silver, and tin, but is not limited to such and may be other conductive materials (e.g., carbon). Furthermore, each of the electrodes 802 and 804 can be formed or manufactured to also include one or more layers or coatings of light altering material (e.g., an anti-reflective material or a light absorbing material) in order to reduce the visibility of the electrodes 802 and 804 to a user of the capacitive touch screen 100. The anti-reflective material can be implemented in a wide variety of ways. For example, the anti-reflective material can include, but is not limited to, a dielectric, silicon oxide, silicon nitride, polymer, glue, and the like. Additionally, the light absorbing material can be implemented in a wide variety of ways. For example in one embodiment, the light absorbing material can include, but is not limited to, visible light absorbing photo resist material, metal oxide, or carbon black. In one embodiment, each of the electrodes 802 and 804 has a width of less than or equal to approximately 10 micrometers, but is not limited to such.

Within FIG. 8, the electrodes 802 are spaced in an approximately Gaussian density distribution, but are not limited to such. Other linear and non-linear density distributions (e.g., Poisson, parabolic, triangular) may also be of benefit to optimal sensing and associated touch position resolution. Additionally, the electrodes 804 are also spaced in a substantially uniform manner, but are not limited to such. In one embodiment, when the capacitive touch screen device 100 that includes the capacitive sensor pattern 800 is placed over or formed onto a display device, each of the electrodes 802 and 804 can be aligned within or positioned over a gap or mask between pixels of the display device, thereby further reducing the visibility of the electrodes 802 and 804 to a user. It is noted that the electrodes 802 and 804 can be coupled to the controller circuitry 110 in a wide variety of ways. For example in one embodiment, one or more subsets of the electrodes 802 can be connected to the controller circuitry 110 via the conductive wires 108, but is not limited to such. Moreover, one or more subsets of the electrodes 804 can be connected to the controller circuitry 110 via the conductive wires 106, but is not limited to such. In one embodiment, each of the electrodes 802 can be spaced in any periodic or aperiodic manner similar to that described herein, but is not limited to such. Furthermore in one embodiment, each of the electrodes 804 can be spaced in any periodic or aperiodic manner similar to that described herein, but is not limited to such.

It is noted that the capacitive sensor pattern 800 may not include all of the elements illustrated by FIG. 8. Additionally, the capacitive sensor pattern 800 can be implemented to include one or more elements not illustrated by FIG. 8. It is pointed out that the capacitive sensor pattern 800 can be utilized or implemented in any manner similar to that described herein, but is not limited to such.

Note that while electrodes 702 in FIG. 7 and 802 in FIG. 8 are shown having connections to the associated touch panel 102 from both left and right sides, they are not limited to such. In system or panel constructions that do not permit the use of vias through the dielectric separator, the overlap of sensor groups can prevent them from being connected together along the same edge of the panel. However, the ability to create conductive vias through dielectric layers is quite common, and their use would allow all electrode sets (e.g., within the same axis) to connect through the same edge of the panel. In one embodiment, where sufficient connection resources are available to route all of the horizontal electrodes or wires of 702 and 802 to one edge of the touch screen substrate 102, these signals may then be joined into their respective sensor groups through connections located off of the touch screen substrate 102.

Figure 9:
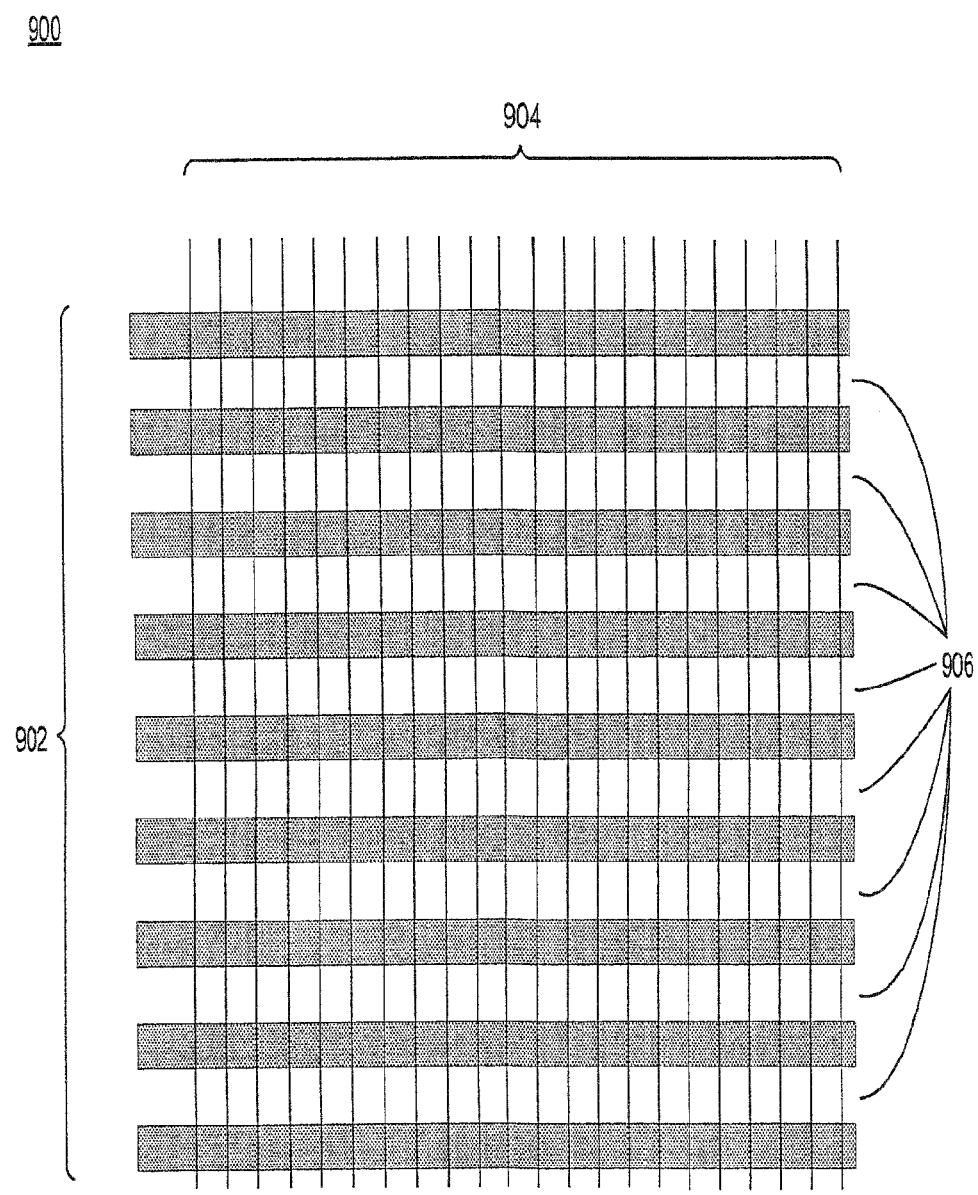
FIG. 9 is a plan view of still another exemplary capacitive sensor pattern in accordance with various embodiments of the invention.

FIG. 9 is a plan view of an exemplary capacitive sensor pattern 900 in accordance with various embodiments of the invention. Specifically, in one embodiment, the capacitive sensor pattern 900 includes a plurality of horizontal electrodes of substantially transparent conductive material 902 (e.g., which allow sensing of position in the Y-axis) that are substantially parallel and a plurality of vertical metal electrodes or wires 904 (e.g., which allow sensing of position in the X-axis) that are substantially parallel. It is pointed out that the substantially transparent electrodes 902 are not electrically connected to the metal electrodes 904. In one embodiment, the substantially transparent electrodes 902 are approximately orthogonal (or perpendicular) to electrodes 904, and vice versa. Note that the electrodes 902 and 904 can be implemented in a wide variety of ways. For example in one embodiment, one or more subsets (or groups) of the substantially transparent electrodes 902 can be coupled together in any manner similar to that described herein, but is not limited to such. In one embodiment, one or more subsets (or groups) of the metal electrodes 904 can be coupled together in any manner similar to that described herein, but is not limited to such. It is noted that each of the substantially transparent electrodes 902 can be formed or manufactured from indium tin oxide (ITO), antimony tin oxide (ATO), stannous oxide (SnO), carbon nanotubes (CNT), or other substantially transparent conductive material, while the electrodes 904 can be formed or manufactured from one or more metals, such as, copper, aluminum, chromium, gold, silver, and tin, but is not limited to such and may be other conductive materials (e.g., carbon). Furthermore, each of the electrodes 904 can be formed or manufactured to also include one or more layers or coatings of light altering material (e.g., an anti-reflective material or a light absorbing material) in order to reduce the visibility of the electrodes 904 to a user of the capacitive touch screen device 100. The anti-reflective material can be implemented in a wide variety of ways. For example, the anti-reflective material can include, but is not limited to, a dielectric, silicon oxide, silicon nitride, polymer, glue, and the like. Additionally, the light absorbing material can be implemented in a wide variety of ways. For example in one embodiment, the light absorbing material can include, but is not limited to, visible light absorbing photo resist material, metal oxide, or carbon black. In one embodiment, each of the electrodes 904 has a width of less than or equal to approximately 10 micrometers, but is not limited to such, while each of the substantially transparent electrodes 902 can be implemented with any desired width. In an embodiment, it is noted that the substantially transparent electrodes 902 can be located or positioned below or beneath the metal conductors 904 (e.g., such that the metal conductors 904 are located between the user and the substantially transparent electrodes 902).

Within FIG. 9, the substantially transparent electrodes 902 are spaced in a substantially uniform manner, but are not limited to such. Additionally, the metal electrodes 904 are also spaced in a substantially uniform manner, but are not limited to such. In one embodiment, when the capacitive touch screen device 100 that includes the capacitive sensor pattern 900 is placed over or formed onto a display device, each of the substantially transparent electrodes 902 may be of such width as to appear to the user to be continuous, wherein the gap 906 between electrodes 902 can be aligned with, within, or positioned over a gap or mask between pixels of the display device, thereby further reducing the visibility of the electrodes 902 to a user. In one embodiment, each of the gaps 906 has a width of less than or equal to approximately 10 micrometers, but is not limited to such. In one embodiment, when the capacitive touch screen device 100 that includes the capacitive sensor pattern 900 is placed over or formed onto a display device, each of the electrodes 904 can be aligned within or positioned over a gap or mask between pixels of the display device, thereby further reducing the visibility of the electrodes 904 to a user. It is noted that the substantially transparent electrodes 902 and the metal electrodes 904 can be coupled to the controller circuitry 110 in a wide variety of ways. For example, the substantially transparent electrodes 902 and the metal electrodes 904 can be coupled to the controller circuitry 110 in any manner similar to that described herein, but is not limited to such. In one embodiment, each of the substantially parallel electrodes 902 can be spaced in any periodic or aperiodic manner similar to that described herein, but is not limited to such. Furthermore in one embodiment, each of the electrodes 904 can be spaced in any periodic or aperiodic manner similar to that described herein, but is not limited to such.

It is noted that the capacitive sensor pattern 900 may not include all of the elements illustrated by FIG. 9. Additionally, the capacitive sensor pattern 900 can be implemented to include one or more elements not illustrated by FIG. 9. It is pointed out that the capacitive sensor pattern 900 can be utilized or implemented in any manner similar to that described herein, but is not limited to such.

Figure 10:
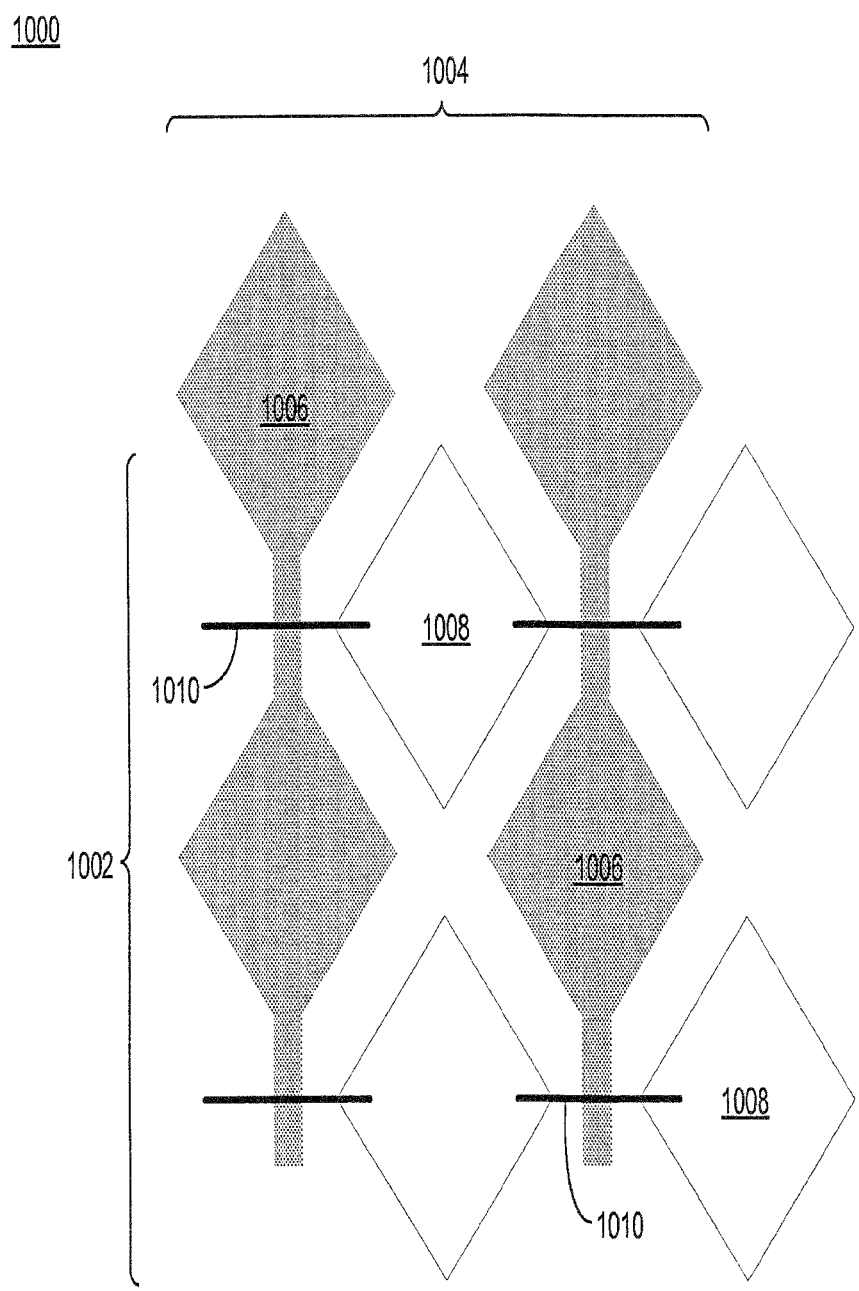
FIG. 10 is a plan view of another exemplary capacitive sensor pattern in accordance with various embodiments of the invention.

FIG. 10 is a plan view of an exemplary capacitive sensor pattern 1000 in accordance with various embodiments of the invention. Specifically, in one embodiment, the capacitive sensor pattern 1000 includes a plurality of horizontal electrodes of substantially transparent conductive material 1002 (e.g., which allow sensing of position in the Y-axis) that are substantially parallel and a plurality of vertical electrodes of substantially transparent conductive material 1004 (e.g., which allow sensing of position in the X-axis) that are substantially parallel. It is pointed out that the substantially transparent electrodes 1002 are not electrically connected to the substantially transparent electrodes 1004. In one embodiment, the electrodes 1002 are approximately orthogonal (or perpendicular) to electrodes 1004, and vice versa. Note that the substantially transparent electrodes 1002 and 1004 can be implemented in a wide variety of ways. For example in one embodiment, each of the substantially transparent electrodes 1004 is composed of a continuous layer of substantially transparent conductive material 1006 having varying width. Furthermore, each of the substantially transparent electrodes 1002 includes a plurality of sections 1008 and metal jumpers 1010. In the present embodiment, each of the metal jumpers 1010 can electrically couple two sections of substantially transparent conductive material 1008 as shown. In an alternate embodiment, the metal jumpers 1010 may span the width of the sensor elements 1008 and may electrically couple more than two sections of substantially transparent conductive material. One or more subsets (or groups) of the substantially transparent electrodes 1002 can be coupled together in any manner similar to that described herein, but is not limited to such. In one embodiment, one or more subsets of the substantially transparent electrodes 1004 can be coupled together in any manner similar to that described herein, but is not limited to such. It is noted that each of the electrodes 1004 can be formed or manufactured from substantially transparent conductive material 1006 that can include indium tin oxide (ITO), antimony tin oxide (ATO), stannous oxide (SnO), carbon nanotubes (CNT), or other substantially transparent conductive material, while the electrodes 1002 can be formed or manufactured from sections 1008 of ITO, ATO, SnO, CNT, or other substantially transparent conductive material, and one or more metal jumpers 1010, but is not limited to such. The one or more metal jumpers 1010 can be formed or manufactured from one or more metals, such as, copper, aluminum, chromium, gold, silver, and tin, but is not limited to such and may be other conductive materials (e.g., carbon). Furthermore, each of the metal jumpers 1010 can be formed or manufactured to also include one or more layers or coatings of light altering material (e.g., an anti-reflective material or a light absorbing material) in order to reduce the visibility of the electrodes 1004 to a user of the capacitive touch screen device 100. The anti-reflective material can be implemented in a wide variety of ways. For example, the anti-reflective material can include, but is not limited to, a dielectric, silicon oxide, silicon nitride, polymer, glue, and the like. Additionally, the light absorbing material can be implemented in a wide variety of ways. For example in one embodiment, the light absorbing material can include, but is not limited to, visible light absorbing photo resist material, metal oxide, or carbon black. In one embodiment, each of the metal jumpers 1010 has a width of less than or equal to approximately 10 micrometers, but is not limited to such.

Within FIG. 10, the substantially transparent electrodes 1002 are spaced in a substantially uniform manner, but are not limited to such. Additionally, the substantially transparent electrodes 1004 are also spaced in a substantially uniform manner, but are not limited to such. In one embodiment, when the capacitive touch screen device 100 that includes the capacitive sensor pattern 1000 is placed over or formed upon a display device, each of the metal jumpers 1010 can be aligned within or positioned over a gap or mask between pixels of the display device, thereby further reducing the visibility of the metal jumpers 1010 to a user. It is noted that the substantially transparent electrodes 1002 and 1004 can be coupled to the controller circuitry 110 in a wide variety of ways. For example, the substantially transparent electrodes 1002 and 1004 can be coupled to the controller circuitry 110 in any manner similar to that described herein, but is not limited to such.

It is noted that the capacitive sensor pattern 1000 may not include all of the elements illustrated by FIG. 10. Additionally, the capacitive sensor pattern 1000 can be implemented to include one or more elements not illustrated by FIG. 10. It is pointed out that the capacitive sensor pattern 1000 can be utilized or implemented in any manner similar to that described herein, but is not limited to such.

Figure 11:
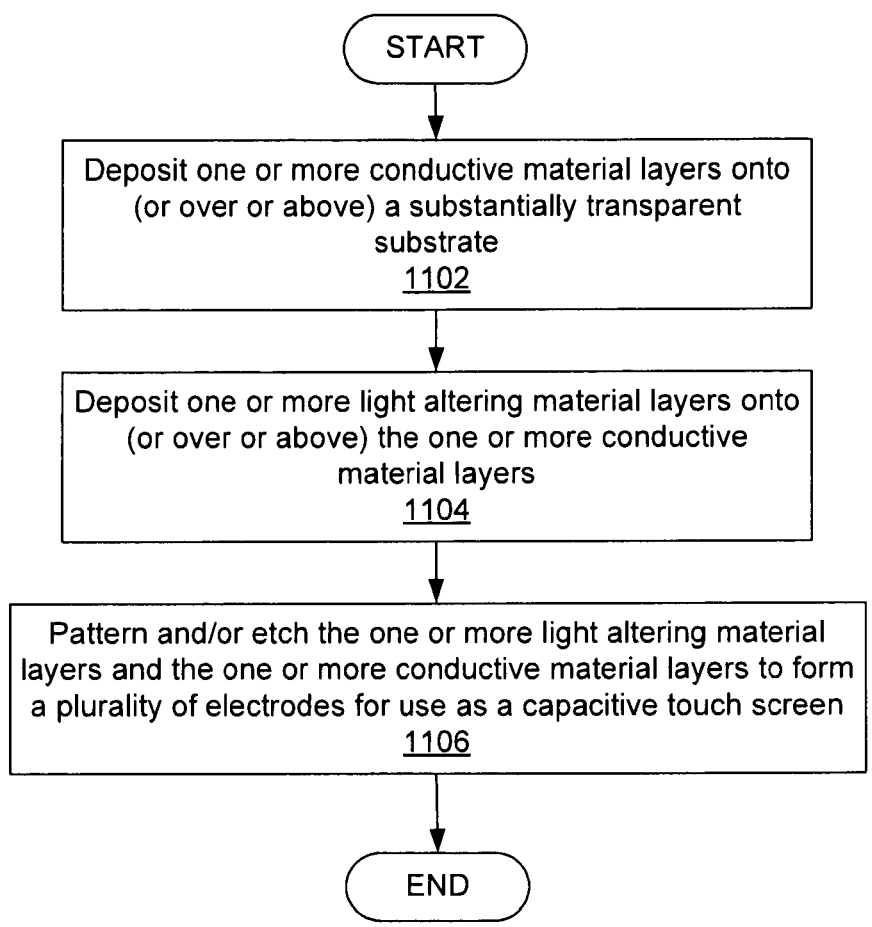
FIG. 11 is a flow diagram of an exemplary method in accordance with various embodiments of the invention.

FIG. 11 is a flow diagram of an example method 1100 in accordance with various embodiments of the invention. Although specific operations are disclosed in flow diagram 1100, such operations are examples. Method 1100 may not include all of the operations illustrated by FIG. 11. Also, embodiments are well suited to performing various other operations or variations of the operations recited in flow diagram 1100. Likewise, the sequence of the operations of flow diagram 1100 can be modified. It is appreciated that not all of the operations in flow diagram 1100 may be performed.

Specifically, method 1100 can include depositing one or more conductive material layers onto (or over or above) a substantially transparent substrate. Additionally, one or more light altering material layers can be deposited onto (or over or above) the one or more conductive material layers. The one or more light altering material layers and the one or more conductive material layers can be patterned or etched to form a plurality of electrodes for use as a capacitive touch screen device.

Figure 11A:
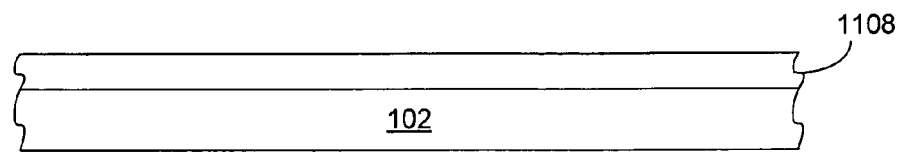
FIG. 11A is a side sectional view of exemplary depositing in accordance with various embodiments of the invention.

At operation 1102 of FIG. 11, one or more conductive material layers can be deposited onto (or over or above) a substantially transparent substrate (e.g., 102 in FIG. 2). It is pointed out that the operation 1102 can be implemented in a wide variety of ways. For example in one embodiment, FIG. 11A is an exemplary side sectional view of one or more conductive material layers 1108 deposited onto (or over or above) the substantially transparent substrate 102. In various embodiments, the depositing of the one or more conductive material layers at operation 1102 can be performed using sputter deposition or plating, but is not limited to such. In addition, in one embodiment, the depositing of the one or more conductive material layers at operation 1102 can include depositing onto (or over or above) a plastic substrate, a glass substrate, or onto (or over or above) a surface of a display itself, but is not limited to such. Note that operation 1102 can be implemented in any manner similar to that described herein, but is not limited to such.

Figure 11B:
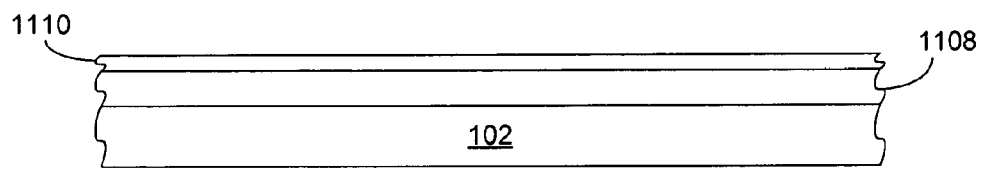
FIG. 11B is a side sectional view of additional exemplary depositing in accordance with various embodiments of the invention.

At operation 1104, one or more light altering material layers can be deposited onto (or over or above) the one or more conductive material layers. It is noted that operation 1104 can be implemented in a wide variety of ways. For example in one embodiment, FIG. 11B is an exemplary side sectional view of one or more light altering material layers 1110 deposited onto (or over or above) the one or more conductive material layers 1108. In various embodiments, the depositing of the one or more light altering material layers at operation 1104 can be performed by, but is not limited to, aerosol spray, spin coating, physical vapor deposition (PVD), chemical vapor deposition (CVD), or sputter deposition. It is noted that operation 1104 can be implemented in any manner similar to that described herein, but is not limited to such.

Figure 11C:
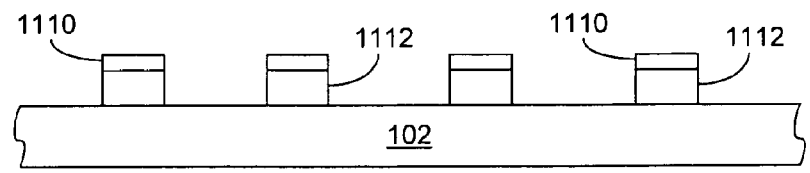
FIG. 11C is a side sectional view of exemplary operations in accordance with various embodiments of the invention.

At operation 1106 of FIG. 11, the one or more light altering material layers and the one or more conductive material layers can be patterned and/or etched to form a plurality of electrodes (e.g., similar to any of 202, 204, 202', 204', 402, 404, 402', 404', 602, 604, 702, 704, 802, 804, and 904) for use as a capacitive touch screen (e.g., 100). Note that operation 1106 can be implemented in a wide variety of ways. For example in one embodiment, FIG. 11C is an exemplary side sectional view of the one or more light altering material layers 1110 and the one or more conductive material layers 1108 having been patterned and/or etched to form a plurality of electrodes 1112. In an embodiment, the etching at operation 1106 can be performed using wet chemical etching, but is not limited to such. In addition, the patterning at operation 1106 can be performed using photolithography or LASER ablation, but is not limited to such. Operation 1106 can be implemented in any manner similar to that described herein, but is not limited to such. At the completion of operation 1106, process 1100 can be exited or ended.

Figure 12:
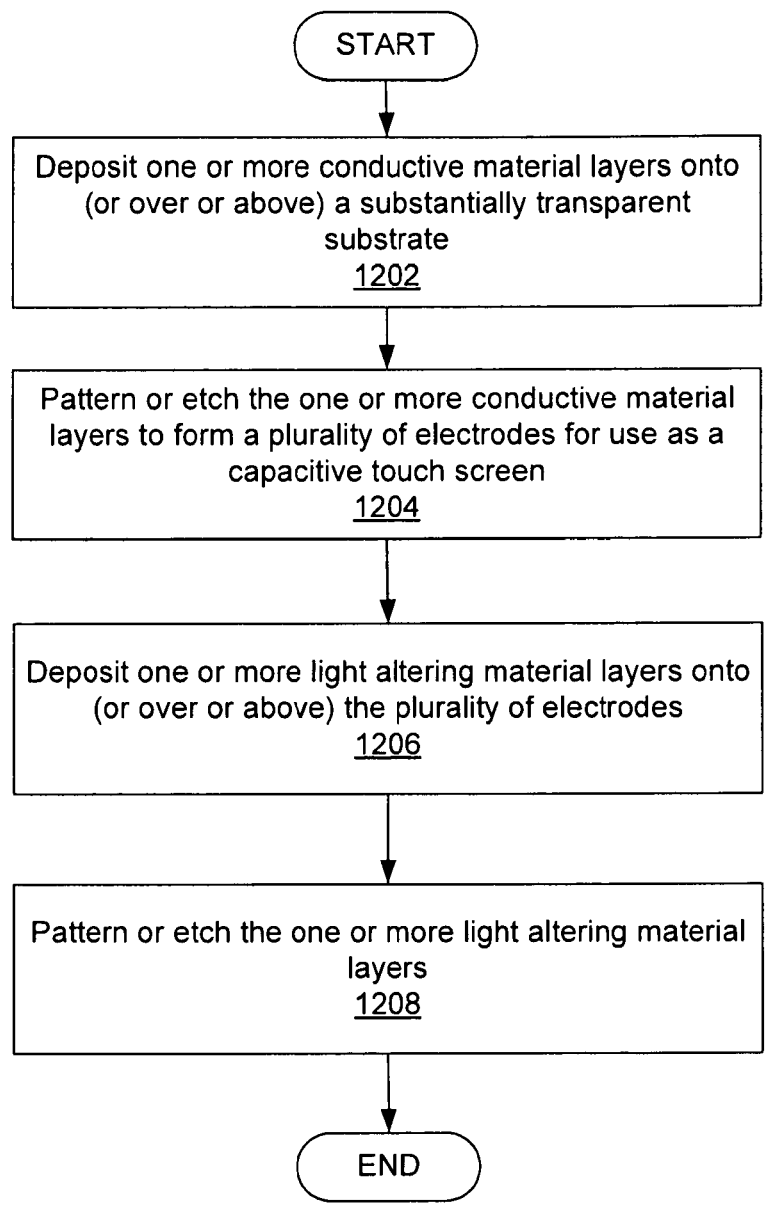
FIG. 12 is a flow diagram of another exemplary method in accordance with various embodiments of the invention.

FIG. 12 is a flow diagram of an example method 1200 in accordance with various embodiments of the invention. Although specific operations are disclosed in flow diagram 1200, such operations are examples. Method 1200 may not include all of the operations illustrated by FIG. 12. Also, embodiments are well suited to performing various other operations or variations of the operations recited in flow diagram 1200. Likewise, the sequence of the operations of flow diagram 1200 can be modified. It is appreciated that not all of the operations in flow diagram 1200 may be performed.

Specifically, method 1200 can include depositing one or more conductive material layers onto (or over or above) a substantially transparent substrate. Furthermore, the one or more conductive material layers can be patterned or etched to form a plurality of electrodes for use as a capacitive touch screen device. Also, one or more light altering material layers can be deposited onto (or over or above) the plurality of electrodes. The one or more light altering material layers can be patterned or etched.

Figure 12A:
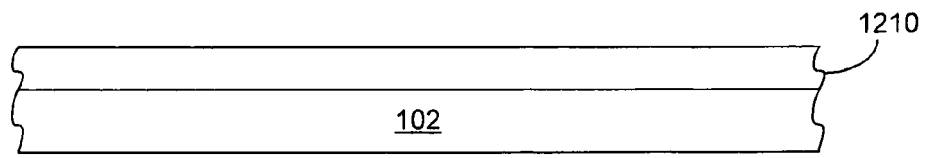
FIG. 12A is a side sectional view of exemplary depositing in accordance with various embodiments of the invention.

At operation 1202 of FIG. 12, one or more conductive material layers can be deposited onto (or over or above) a substantially transparent substrate (e.g., 102). It is pointed out that the operation 1202 can be implemented in a wide variety of ways. For example in one embodiment, FIG. 12A is an exemplary side sectional view of one or more conductive material layers 1210 deposited onto (or over or above) the substantially transparent substrate 102. It is noted that operation 1202 can be implemented in any manner similar to that described herein, but is not limited to such.

Figure 12B:
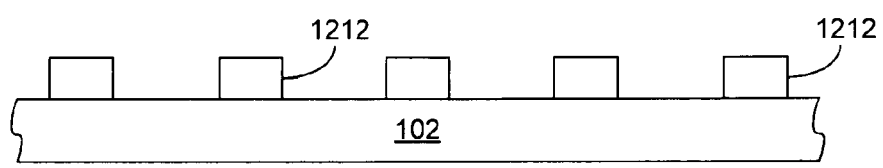
FIG. 12B is a side sectional view of exemplary operations in accordance with various embodiments of the invention.

At operation 1204, the one or more conductive material layers can be patterned or etched to form a plurality of electrodes (e.g., similar to any of 202, 204, 202', 204', 402, 404, 402', 404', 602, 604, 702, 704, 802, 804, and 904) for use as a capacitive touch screen (e.g., 100). Note that operation 1204 can be implemented in a wide variety of ways. For example in one embodiment, FIG. 12B is an exemplary side sectional view of the one or more conductive material layers 1210 having been patterned or etched to form a plurality of electrodes 1212. Note that operation 1204 can be implemented in any manner similar to that described herein, but is not limited to such.

Figure 12C:
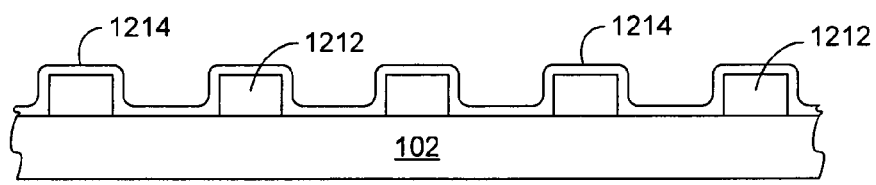
FIG. 12C is a side sectional view of exemplary depositing in accordance with various embodiments of the invention.
Figure 12D:
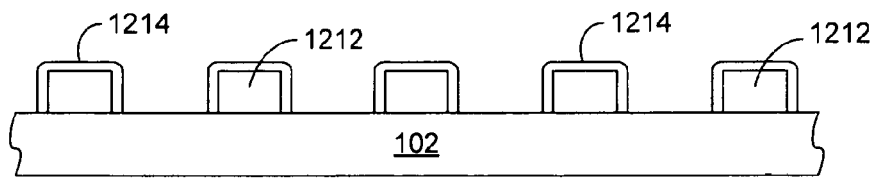
FIG. 12D is a side sectional view of exemplary operations in accordance with various embodiments of the invention.

At operation 1206 of FIG. 12, one or more light altering material layers can be deposited onto (or over or above) the plurality of electrodes. It is noted that operation 1206 can be implemented in a wide variety of ways. For example in one embodiment, FIG. 12C is an exemplary side sectional view of one or more light altering material layers 1214 deposited onto (or over or above) the plurality of electrodes 1212. It is noted that operation 1206 can be implemented in any manner similar to that described herein, but is not limited to such.

At operation 1208, the one or more light altering material layers can be patterned or etched. It is noted that operation 1208 can be implemented in a wide variety of ways. For example, in one embodiment, FIG. 12O is an exemplary side sectional view of the one or more light altering material layers 1214 having been patterned or etched. Note that operation 1208 can be implemented in any manner similar to that described herein, but is not limited to such. At the completion of operation 1208, process 1200 can be exited or ended.

Figure 13:
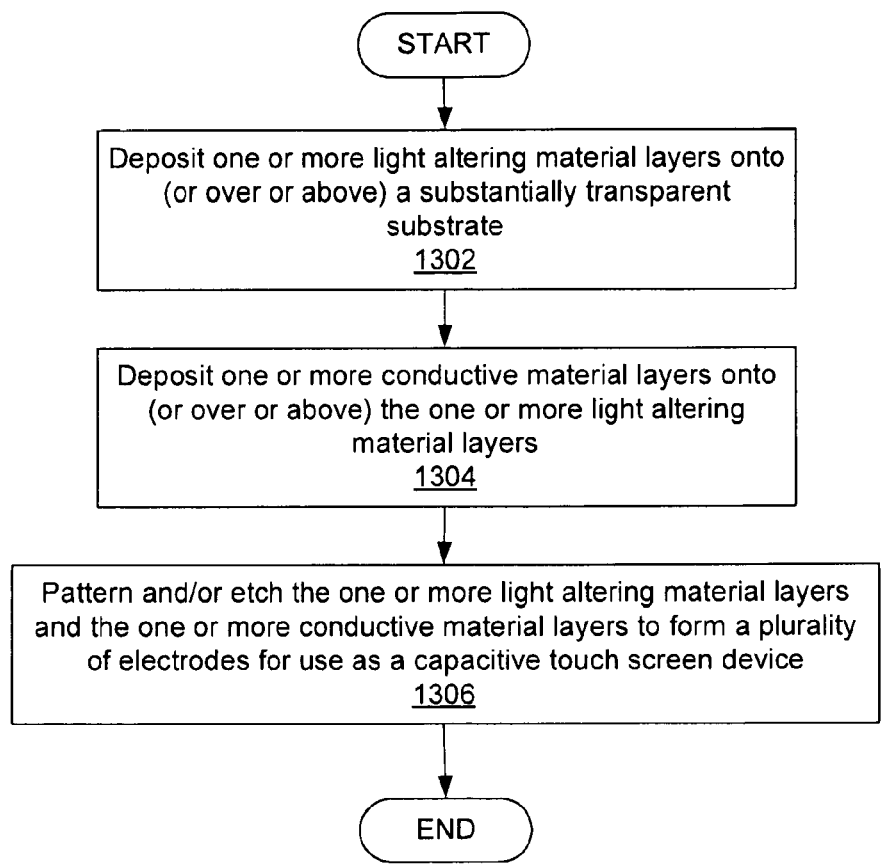
FIG. 13 is a flow diagram of yet another exemplary method in accordance with various embodiments of the invention.

FIG. 13 is a flow diagram of an example method 1300 in accordance with various embodiments of the invention. Although specific operations are disclosed in flow diagram 1300, such operations are examples. Method 1300 may not include all of the operations illustrated by FIG. 13. Also, embodiments are well suited to performing various other operations or variations of the operations recited in flow diagram 1300. Likewise, the sequence of the operations of flow diagram 1300 can be modified. It is appreciated that not all of the operations in flow diagram 1300 may be performed.

Specifically, method 1300 can include depositing one or more light altering material layers onto (or over or above) a substantially transparent substrate. Additionally, one or more conductive material layers can be deposited onto (or over or above) the one or more light altering material layers. The one or more light altering material layers and the one or more conductive material layers can be patterned and/or etched to form a plurality of electrodes for use as a capacitive touch screen device.

Figure 13A:
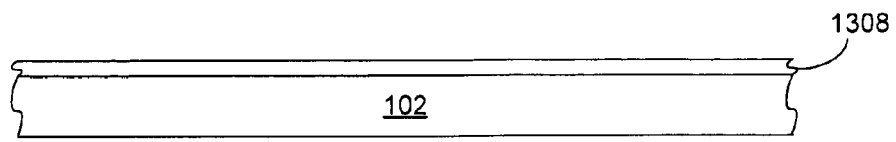
FIG. 13A is a side sectional view of exemplary depositing in accordance with various embodiments of the invention.

At operation 1302 of FIG. 13, one or more light altering material layers can be deposit onto (or over or above) a substantially transparent substrate (e.g., 102). It is pointed out that the operation 1302 can be implemented in a wide variety of ways. For example in one embodiment, FIG. 13A is an exemplary side sectional view of one or more light altering material layers 1308 deposited onto (or over or above) the substantially transparent substrate 102. It is noted that operation 1302 can be implemented in any manner similar to that described herein, but is not limited to such.

Figure 13B:
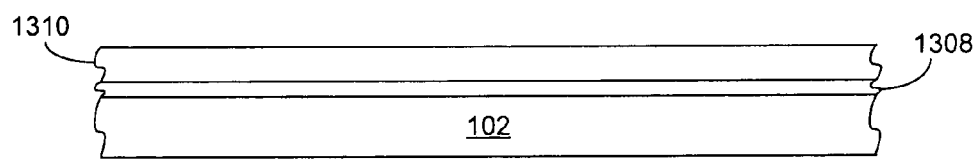
FIG. 13B is a side sectional view of additional exemplary depositing in accordance with various embodiments of the invention.

At operation 1304, one or more conductive material layers can be deposited onto (or over or above) the one or more light altering material layers. It is noted that operation 1304 can be implemented in a wide variety of ways. For example in one embodiment, FIG. 13B is an exemplary side sectional view of one or more conductive material layers 1310 deposited onto (or over or above) the one or more light altering material layers 1308. Note that operation 1304 can be implemented in any manner similar to that described herein, but is not limited to such.

Figure 13C:
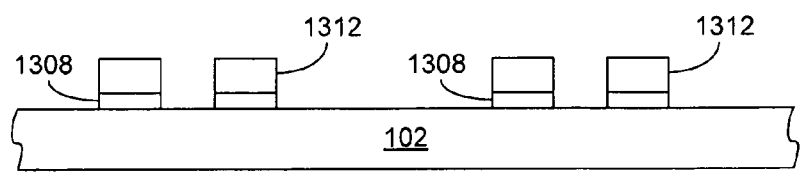
FIG. 13C is a side sectional view of exemplary operations in accordance with various embodiments of the invention.

At operation 1306 of FIG. 13, the one or more light altering material layers and the one or more conductive material layers can be patterned and/or etched to form a plurality of electrodes (e.g., similar to any of 202, 204, 202', 204', 402, 404, 402', 404', 602, 604, 702, 704, 802, 804, and 904) for use as a capacitive touch screen (e.g., 100). Note that operation 1306 can be implemented in a wide variety of ways. For example in one embodiment, FIG. 13C is an exemplary side sectional view of the one or more light altering material layers 1308 and the one or more conductive material layers 1310 having been patterned and/or etched to form a plurality of electrodes 1312. It is noted that operation 1306 can be implemented in any manner similar to that described herein, but is not limited to such. At the completion of operation 1306, process 1300 can be exited or ended.

Figure 14:
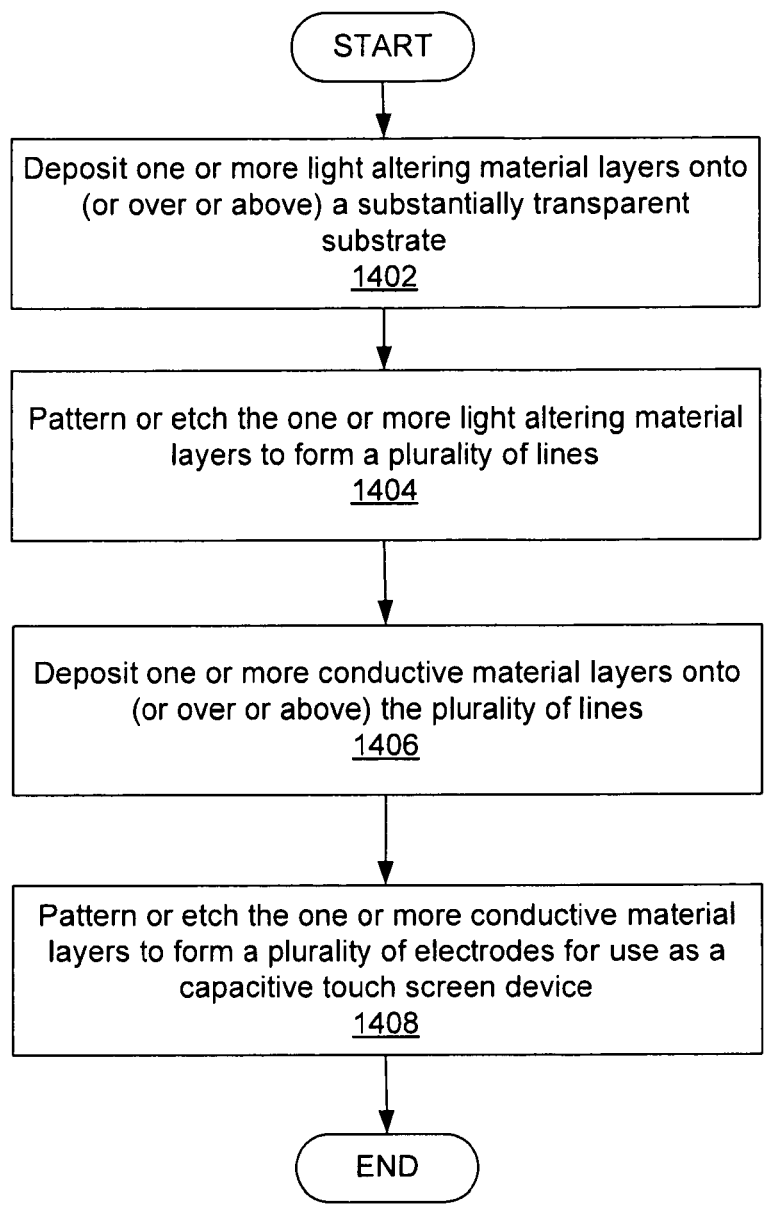
FIG. 14 is a flow diagram of still another exemplary method in accordance with various embodiments of the invention.

FIG. 14 is a flow diagram of an example method 1400 in accordance with various embodiments of the invention. Although specific operations are disclosed in flow diagram 1400, such operations are examples. Method 1400 may not include all of the operations illustrated by FIG. 14. Also, embodiments are well suited to performing various other operations or variations of the operations recited in flow diagram 1400. Likewise, the sequence of the operations of flow diagram 1400 can be modified. It is appreciated that not all of the operations in flow diagram 1400 may be performed.

Specifically, method 1400 can include depositing one or more light altering material layers onto (or over or above) a substantially transparent substrate. In addition, the one or more light altering material layers can be patterned or etched to form a plurality of lines. Furthermore, one or more conductive material layers can be deposited onto (or over or above) the plurality of lines. The one or more conductive material layers can be patterned or etched to form a plurality of electrodes for use as a capacitive touch screen device.

Figure 14A:
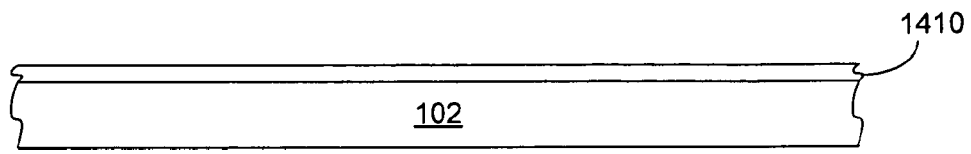
FIG. 14A is a side sectional view of exemplary depositing in accordance with various embodiments of the invention.

At operation 1402 of FIG. 14, one or more light altering material layers can be deposit onto (or over or above) a substantially transparent substrate (e.g., 102). It is pointed out that the operation 1402 can be implemented in a wide variety of ways. For example in one embodiment, FIG. 14A is an exemplary side sectional view of one or more light altering material layers 1410 deposited onto (or over or above) the substantially transparent substrate 102. It is noted that operation 1402 can be implemented in any manner similar to that described herein, but is not limited to such.

Figure 14B:
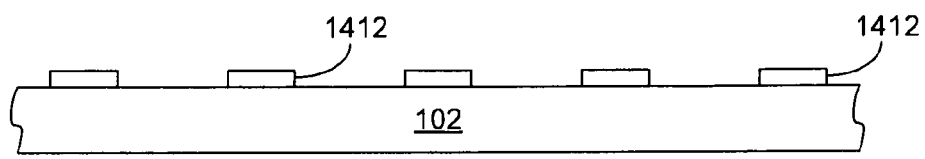
FIG. 14B is a side sectional view of exemplary operations in accordance with various embodiments of the invention.

At operation 1404, the one or more light altering material layers can be patterned or etched to form a plurality of lines (e.g., similar to any of electrodes 202, 204, 202', 204', 402, 404, 402', 404', 602, 604, 702, 704, 802, 804, and 904). Note that operation 1404 can be implemented in a wide variety of ways. For example in one embodiment, FIG. 14B is an exemplary side sectional view of the one or more light altering material layers 1410 having been patterned or etched to form a plurality of electrodes 1412. Note that operation 1404 can be implemented in any manner similar to that described herein, but is not limited to such.

Figure 14C:
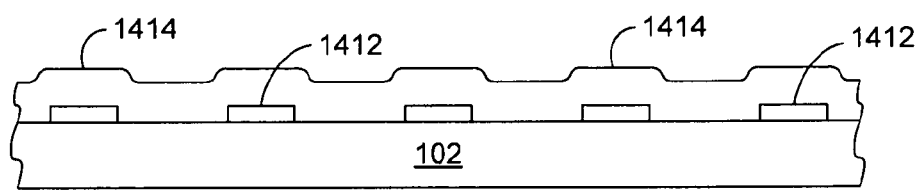
FIG. 14C is a side sectional view of exemplary depositing in accordance with various embodiments of the invention.

At operation 1406 of FIG. 14, one or more conductive material layers can be deposited onto (or over or above) the plurality of lines. It is noted that operation 1406 can be implemented in a wide variety of ways. For example in one embodiment, FIG. 14C is an exemplary side sectional view of one or more conductive material layers 1414 deposited onto (or over or above) the plurality of lines 1412. It is noted that operation 1406 can be implemented in any manner similar to that described herein, but is not limited to such.

Figure 14D:
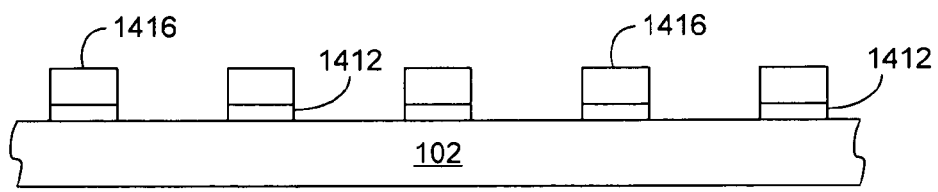
FIG. 14D is a side sectional view of exemplary operations in accordance with various embodiments of the invention.

At operation 1408, the one or more conductive material layers can be patterned or etched to form a plurality of electrodes (e.g., similar to any of 202, 204, 202', 204', 402, 404, 402', 404', 602, 604, 702, 704, 802, 804, and 904) for use as a capacitive touch screen device (e.g., 100). It is noted that operation 1408 can be implemented in a wide variety of ways. For example in one embodiment, FIG. 14D is an exemplary side sectional view of the one or more conductive material layers 1414 having been patterned or etched to form a plurality of electrodes 1416. Note that operation 1408 can be implemented in any manner similar to that described herein, but is not limited to such. At the completion of operation 1408, process 1400 can be exited or ended.

The foregoing descriptions of various specific embodiments in accordance with the invention have been presented for purposes of illustration and description. They are not intended to be exhaustive or to limit the invention to the precise forms disclosed, and many modifications and variations are possible in light of the above teaching. The invention is to be construed according to the Claims and their equivalents.

What is claimed is:

1. A capacitive touch screen comprising:
  a display device comprising a functional display element attached to a substantially transparent substrate;
  a first plurality of electrodes attached to the substantially transparent substrate, wherein the first plurality of electrodes are substantially parallel in a first direction;
  a pattern through which visible light emitted by the functional display does not pass, wherein each of the first plurality of electrodes are aligned within or positioned over one or more portions of the pattern; and
  a second plurality of electrodes, wherein each of the second plurality of electrodes crosses each of the plurality of first electrodes and each of the second plurality of electrodes is configured to capacitively couple with each of the first plurality of electrodes.

2. The capacitive touch screen of claim 1, wherein the functional display element comprises the pattern, wherein the pattern comprises a mask pattern attached to the substantially transparent substrate.

3. The capacitive touch screen of claim 1, wherein the first plurality of electrodes is attached to a first side of the substantially transparent substrate opposite a second side of the substantially transparent substrate on which the functional display element is attached.

4. The capacitive touch screen of claim 1, wherein each of the first plurality of electrodes is made from a substantially transparent conductive material.

5. The capacitive touch screen of claim 1, wherein each gap between the first plurality of electrodes is less than or equal to 10 micrometers.

6. The capacitive touch screen of claim 1, wherein the second plurality of electrodes is attached to the same side of the substantially transparent substrate as the first plurality of electrodes.

7. The capacitive touch screen of claim 1, wherein each of the second plurality of electrodes is substantially perpendicular to each of the first plurality of electrodes.

8. The capacitive touch screen of claim 1, further comprising a solid layer of light altering material formed between one of the first plurality of electrodes and a corresponding one of the second plurality of electrodes.

9. A capacitive touch screen comprising:
a display device;
a functional display element attached to a substantially transparent substrate overlaying a viewable area of the display device;
a first plurality of electrodes attached to a side of said substantially transparent substrate opposite the display device, wherein said plurality of electrodes are substantially parallel in a first direction;
a pattern through which visible light emitted by the functional display does not pass, wherein the each of the first plurality of electrodes are aligned within or positioned over one or more portions of the pattern; and
a second plurality of electrodes, wherein each of the electrodes of the second plurality of electrodes crosses each of the electrodes of the first plurality of electrodes and each of the electrodes of the second plurality of electrodes is configured to capacitively couple with each electrode of the first plurality of electrodes.

10. The capacitive touch screen of claim 9, wherein the functional display element comprises the pattern and the pattern comprises a mask pattern.

11. The capacitive touch screen of claim 9, wherein the first plurality of electrodes is attached to a first side of the substantially transparent substrate opposite a second side of the substantially transparent substrate on which the functional display element is attached.

12. The capacitive touch screen of claim 9, wherein a gap between each of the first plurality of electrodes is less than or equal to 10 micrometers.

13. The capacitive touch screen of claim 9, wherein the second plurality of electrodes is attached to the same side of the substantially transparent substrate as the first plurality of electrodes.

14. The capacitive touch screen of claim 9, wherein each of the second plurality of electrodes is substantially perpendicular to each of the first plurality of electrodes.

15. The capacitive touch screen of claim 9, further comprising a solid layer of light altering material formed between one of the first plurality of electrodes and a corresponding one of the second plurality of electrodes.

16. A method comprising:
depositing a first conductive material layer over a substantially transparent substrate of a display device, wherein a functional display element is attached to at least one side of the substantially transparent substrate;
patterning the first conductive material layer to form a first plurality of electrodes, wherein the first plurality of electrodes are substantially parallel;
patterning a mask configured to block visible light emitted by the functional display element, wherein the patterning of the first conductive material layer includes forming each of the first plurality of electrodes in alignment with, or positioned over, one or more portions of the mask; and
constructing a second plurality of electrodes coupled with the display device, wherein each of the second plurality of electrodes crosses each of the plurality of first electrodes and each of the second plurality of electrodes is configured to capacitively couple with each of the first plurality of electrodes.

17. The method of claim 16, further comprising depositing a light altering material layer over said conductive material layer.

18. The method of claim 17, wherein the light altering material layer is a light absorbing material.

19. The method of claim 16, wherein constructing the second plurality of electrodes comprises depositing a second conductive material layer over the first plurality of electrodes.

* * * * *